United States Patent [19]
Olson

[11] Patent Number: 5,878,370
[45] Date of Patent: Mar. 2, 1999

[54] VEHICLE COMPASS SYSTEM WITH VARIABLE RESOLUTION

[75] Inventor: Thomas R. Olson, Holland, Mich.

[73] Assignee: Prince Corporation, Holland, Mich.

[21] Appl. No.: 566,014

[22] Filed: Dec. 1, 1995

[51] Int. Cl.[6] .............................. G01C 17/28; G01R 33/06
[52] U.S. Cl. ............................ 701/224; 33/319; 324/202
[58] Field of Search .................................. 364/457, 450, 364/449.1, 449.95, 571.01, 571.04, 571.05, 559; 33/319, 356, 361, 352, 363 R; 324/202, 244, 260; 73/1 E, 1.76, 178 R

[56] References Cited

U.S. PATENT DOCUMENTS

| | | | |
|---|---|---|---|
| 2,053,154 | 9/1936 | Pierre | 171/95 |
| 2,056,715 | 10/1936 | Dinsmore | 33/223 |
| 2,132,168 | 10/1938 | Klein et al. | 33/223 |
| 2,177,218 | 10/1939 | Klein et al. | 33/364 |
| 2,308,566 | 1/1943 | Noxon | 33/204 |
| 2,475,593 | 7/1949 | Craddock et al. | 318/24 |
| 2,852,859 | 9/1958 | Depp | 33/361 |
| 2,903,798 | 9/1959 | Taylor | 33/225 |
| 3,626,280 | 12/1971 | Van Englehoven et al. | 324/253 |
| 3,678,593 | 7/1972 | Baker et al. | 33/361 |
| 3,744,312 | 7/1973 | Anderson | 73/178 R |
| 3,746,842 | 7/1973 | Fowler | 33/363 K |
| 3,778,703 | 12/1973 | Jackson | 324/202 |
| 3,807,666 | 4/1974 | Devlin | 244/194 |
| 3,903,610 | 9/1975 | Heaviside et al. | 33/361 |
| 3,943,763 | 3/1976 | Garner | 73/178 R |
| 3,971,981 | 7/1976 | Nakagome | 324/254 |
| 3,991,361 | 11/1976 | Mattern et al. | 324/244 |
| 4,023,018 | 5/1977 | Hall | 364/449.1 |
| 4,024,382 | 5/1977 | Fowler | 364/449.1 |
| 4,030,204 | 6/1977 | Edwards | 33/361 |
| 4,031,630 | 6/1977 | Fowler | 33/356 |
| 4,091,543 | 5/1978 | Lapeyre | 33/356 |
| 4,112,755 | 9/1978 | Sullivan | 73/178 R |
| 4,143,467 | 3/1979 | Erspamer et al. | 33/356 |
| 4,146,970 | 4/1979 | Edwards | 33/363 K |
| 4,157,619 | 6/1979 | Zuvela | 33/352 |
| 4,163,326 | 8/1979 | Edwards | 33/361 |
| 4,179,741 | 12/1979 | Rossani | 364/457 |
| 4,250,626 | 2/1981 | Lazar | 33/363 R |
| 4,277,751 | 7/1981 | Lawson et al. | 324/254 |
| 4,293,815 | 10/1981 | West et al. | 324/254 |
| 4,309,828 | 1/1982 | Sakamoto | 33/355 R |
| 4,336,596 | 6/1982 | Martin | 364/559 |
| 4,341,023 | 7/1982 | Marcus et al. | 33/363 K |
| 4,347,730 | 9/1982 | Fisher et al. | 73/1.76 |
| 4,373,271 | 2/1983 | Nitz | 33/361 |
| 4,413,424 | 11/1983 | Sasaki et al. | 33/361 |
| 4,414,753 | 11/1983 | Moulin et al. | 33/356 |
| 4,416,067 | 11/1983 | Scherer et al. | 364/571.04 |
| 4,424,631 | 1/1984 | Franks | 33/361 |
| 4,425,717 | 1/1984 | Marcus | 33/361 |
| 4,429,469 | 2/1984 | Tsushima et al. | 33/361 |
| 4,445,279 | 5/1984 | Tsushima et al. | 33/363 Q |
| 4,505,054 | 3/1985 | Clark et al. | 33/357 |
| 4,539,760 | 9/1985 | Marchent et al. | 33/357 |
| 4,546,550 | 10/1985 | Marchent et al. | 33/356 |
| 4,546,551 | 10/1985 | Franks | 33/356 |
| 4,555,761 | 11/1985 | Matsumoto et al. | 364/449.1 |
| 4,622,754 | 11/1986 | Chujo et al. | 33/356 |
| 4,622,843 | 11/1986 | Hormel | 73/1.76 |
| 4,672,565 | 6/1987 | Kuno et al. | 364/571.04 |
| 4,677,381 | 6/1987 | Geerlings | 324/253 |

(List continued on next page.)

*Primary Examiner*—Tan Q. Nguyen
*Attorney, Agent, or Firm*—Price, Heneveld, Cooper, DeWitt & Litton

[57] ABSTRACT

A vehicle compass system including a magnetic field sensor from which the earth's magnetic field can be detected in two channels of measurement. The sensor is coupled to a processing circuit which samples the sensor data and determines the maximum and minimum signal levels in each channel of measurement during movement of the vehicle through a 360° path of travel. Based on the spans between the maximum and minimum signal levels, adjustment signals are generated for adjusting the resolution of the compass system and the maximum and minimum signal levels of subsequent sensor data so that the system's sensitivity resolution may be adjusted and accurate heading information can be calculated and displayed regardless of the strength of the earth's magnetic field.

33 Claims, 18 Drawing Sheets

U.S. PATENT DOCUMENTS

| | | | |
|---|---|---|---|
| 4,677,754 | 7/1987 | Hormel | 33/361 |
| 4,680,866 | 7/1987 | Johnson et al. | 33/361 |
| 4,685,053 | 8/1987 | Hattori et al. | 364/184 |
| 4,686,772 | 8/1987 | Sobel | 33/333 |
| 4,698,912 | 10/1987 | Fowler et al. | 33/356 |
| 4,729,172 | 3/1988 | Alberter et al. | 33/361 |
| 4,738,031 | 4/1988 | Alberter et al. | 33/356 |
| 4,751,783 | 6/1988 | Ina et al. | 33/361 |
| 4,782,453 | 11/1988 | Bauer et al. | 364/559 |
| 4,791,729 | 12/1988 | Suda | 33/356 |
| 4,807,462 | 2/1989 | Al-Attar | 73/1.76 |
| 4,851,775 | 7/1989 | Kim et al. | 324/247 |
| 4,862,594 | 9/1989 | Schierbeek et al. | 33/356 |
| 4,866,627 | 9/1989 | Suyama | 364/457 |
| 4,953,305 | 9/1990 | Van Lente et al. | 33/356 |
| 5,090,231 | 2/1992 | Gallagher | 364/559 |
| 5,161,311 | 11/1992 | Esmer et al. | 33/356 |
| 5,165,269 | 11/1992 | Nguyen | 73/1.76 |
| 5,235,514 | 8/1993 | Matsuzaki | 364/454 |
| 5,239,264 | 8/1993 | Hawks | 324/253 |
| 5,255,442 | 10/1993 | Scherbeek et al. | 33/361 |
| 5,287,297 | 2/1994 | Ihara et al. | 364/571.02 |
| 5,390,122 | 2/1995 | Michaels et al. | 364/443 |
| 5,632,092 | 5/1997 | Blank et al. | 33/361 |

Fig. 4
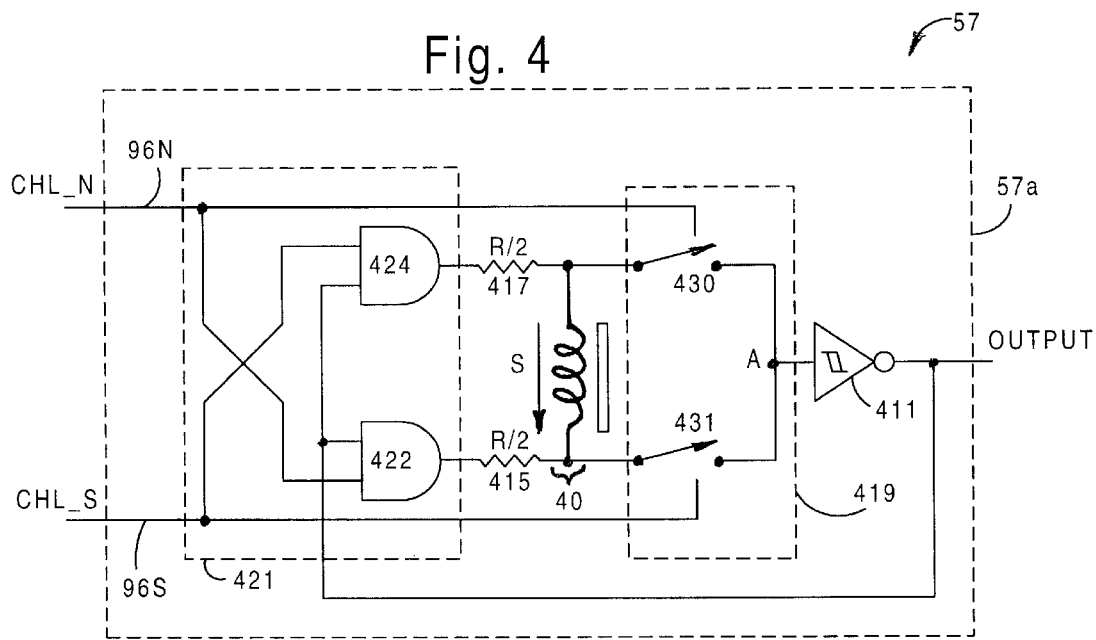
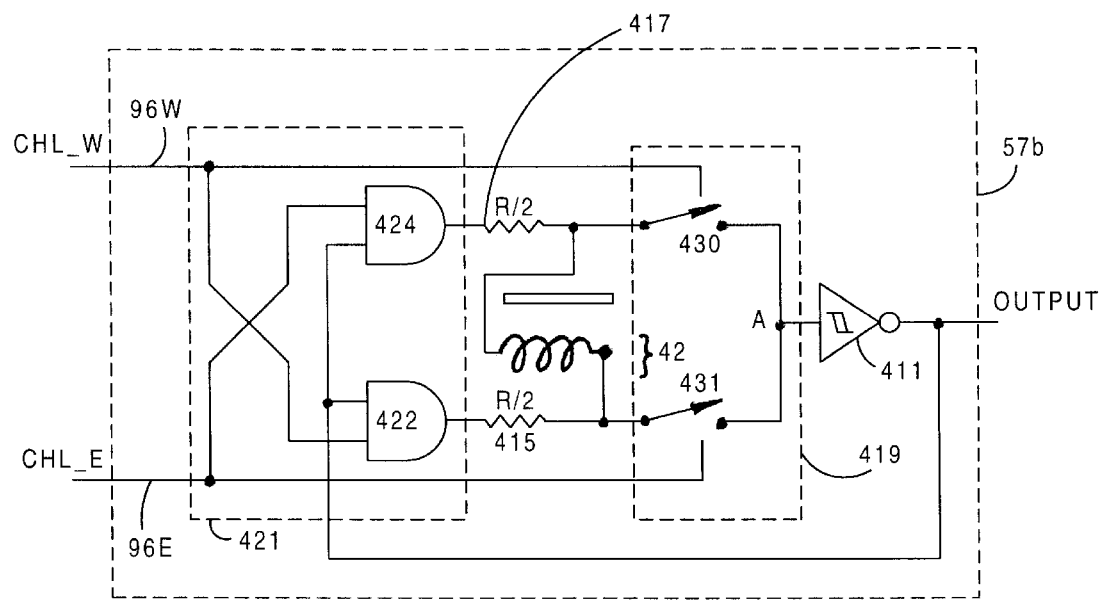

| | STATE | DESCRIPTION | RCLEAR(1) | DELAY(1) | RENABLE_E(1) | CLEAR(0) | U/D(0) | ENABLE(1) | LATCH_N(0) | LATCH_E(0) | CHL_N(0) | CHL_S(0) | CHL_E(0) | CHL_W(0) |
|---|---|---|---|---|---|---|---|---|---|---|---|---|---|---|
| 0 | 0000 | INITIALIZE NORTH | 1 | 0 | 1 | 0 | 0 | 1 | 0 | 0 | 1 | 0 | 0 | 0 |
| 1 | 0001 | START NORTH | 0 | 1 | 1 | 0 | 0 | 1 | 0 | 0 | 1 | 0 | 0 | 0 |
| 2 | 0010 | START TIMING NORTH | 0 | 1 | 1 | 1 | 0 | 0 | 0 | 0 | 1 | 0 | 0 | 0 |
| 3 | 0011 | HALT TIMER | 1 | 1 | 1 | 1 | 1 | 1 | 0 | 0 | 0 | 0 | 0 | 0 |
| 4 | 0100 | INITIALIZE SOUTH | 1 | 0 | 1 | 1 | 1 | 1 | 0 | 0 | 0 | 1 | 0 | 0 |
| 5 | 0101 | START SOUTH | 0 | 1 | 1 | 1 | 1 | 1 | 0 | 0 | 0 | 1 | 0 | 0 |
| 6 | 0110 | START TIMER SOUTH | 0 | 1 | 1 | 1 | 0 | 0 | 0 | 0 | 0 | 1 | 0 | 0 |
| 7 | 0111 | HALT TIMER | 1 | 1 | 1 | 1 | 0 | 1 | 1 | 0 | 0 | 0 | 0 | 0 |
| 8 | 1000 | INITIALIZE EAST | 1 | 0 | 0 | 0 | 0 | 1 | 0 | 0 | 0 | 0 | 1 | 0 |
| 9 | 1001 | START EAST | 0 | 1 | 0 | 1 | 0 | 1 | 0 | 0 | 0 | 0 | 1 | 0 |
| 10 | 1010 | START TIMING EAST | 0 | 1 | 0 | 1 | 1 | 0 | 0 | 0 | 0 | 0 | 1 | 0 |
| 11 | 1011 | HALT TIMER | 1 | 0 | 0 | 1 | 1 | 1 | 0 | 0 | 0 | 0 | 0 | 0 |
| 12 | 1100 | INITIALIZE WEST | 1 | 1 | 0 | 0 | 1 | 1 | 0 | 0 | 0 | 0 | 0 | 1 |
| 13 | 1101 | START WEST | 0 | 1 | 0 | 1 | 1 | 1 | 0 | 0 | 0 | 0 | 0 | 1 |
| 14 | 1110 | START TIMING WEST | 0 | 1 | 0 | 1 | 1 | 0 | 0 | 0 | 0 | 0 | 0 | 1 |
| 15 | 1111 | HALT TIMER | 1 | 1 | 0 | 1 | 0 | 1 | 0 | 1 | 0 | 0 | 0 | 0 |

COMPASS STATE MACHINE
STATE OUTPUT MATRIX

Fig. 6

VEHICLE COMPASS SYSTEM WITH VARIABLE RESOLUTION

BACKGROUND OF THE INVENTION

The present invention relates to magnetic direction sensing systems and particularly those for use in vehicles.

U.S. Pat. No. 4,953,305, assigned to the present assignee, discloses a magnetic field sensor and microprocessor controlled compass system for a vehicle which is automatically and continuously calibrated to account for changes in the vehicle's magnetism and thus the system's reaction to the earth's magnetic field during the life of the vehicle. The system includes means for testing the data received from the compass sensor to determine the maximum and minimum signal levels during movement of the vehicle through a completed 360° path of travel however circuitous the path may be. This data is averaged over several such paths of vehicular travel to provide continuously updated and averaged compensation correction information.

The compass system of the above-mentioned patent senses the magnitude of the earth's magnetic field in two channels of measurement. This data, converted into count values, can be plotted on an X-Y coordinate plane and, when the compass system is properly calibrated, creates a perfect circle around the origin of the plane when the vehicle has completed a 360° path of travel. The radius of the circle represents the earth's magnetic field strength, and the vehicle's compass heading at a particular time during travel is represented by a point on the circle. By calculating the angle which the point forms with the X-Y coordinate plane, the compass heading of the vehicle may be determined.

Although this system is a substantial improvement in vehicle compass operation and provides more accurate heading information over differing operating conditions, it is subject to display error in environments in which the earth's magnetic field is largely vertical in nature. The earth's magnetic field, comprised of both vertical and horizontal components, is mostly horizontal near the equator and progressively becomes more vertical as one travels into the northern or southern latitudes. When the earth's magnetic field is predominantly vertical, the compass sensor, which is oriented to sense the horizontal components of the earth's magnetic field, senses a smaller than usual magnetic field. As a result, the plot of sensor data (converted into count values) creates a smaller than usual circle when the vehicle travels in a closed loop. Because a smaller circle is comprised of fewer count values than a larger circle, a smaller circle can be resolved into fewer angles from which the heading of the vehicle is calculated. This decreased resolution causes the accuracy of the heading information provided by the compass system to be less than optimal under such environmental conditions.

Thus, there exists a need for a compass compensation system capable of adapting to environments having relatively low sensed magnetic field strengths so that highly accurate heading information may be provided under such conditions.

SUMMARY OF THE INVENTION

The present invention provides an improved compass system capable of adapting to environments having low sensed magnetic field strengths. In particular, a compass system is provided which, while automatically and continuously calibrating the vehicle's compass to account for changes in vehicular magnetism, can also vary the resolution of the compass information.

The electronic compass system constructed according to the preferred embodiment of the present invention includes sensing means for detecting the earth's magnetic field and for providing electrical signals representative of the direction of the vehicle with respect to the earth's magnetic field and circuit means coupled to the sensing means for providing display output signals representing heading information corresponding to the detected direction. The preferred compass system further includes display means coupled to the circuit means for displaying the vehicle heading in response to the display output signals. The circuit means includes processing means responsive to the direction representative signals for determining a relative field strength of the earth's magnetic field and for varying the resolution at which the circuit means translates the direction representative signals into heading information as a function of the detected strength of the earth's magnetic field to maintain a consistent degree of accuracy of the displayed heading information.

These and other features, advantages and objects of the present invention will be further understood and appreciated by those skilled in the art by reference to the following specification, claims and appended drawings.

BRIEF DESCRIPTION OF THE DRAWINGS

FIG. 4 is an electrical circuit diagram in schematic form of an exemplary oscillator used in the interface circuit shown in FIG. 3;

FIG. 6 is a state table showing the outputs of the state machine for each operating state;

DETAILED DESCRIPTION OF THE PREFERRED EMBODIMENT

Figure 1:
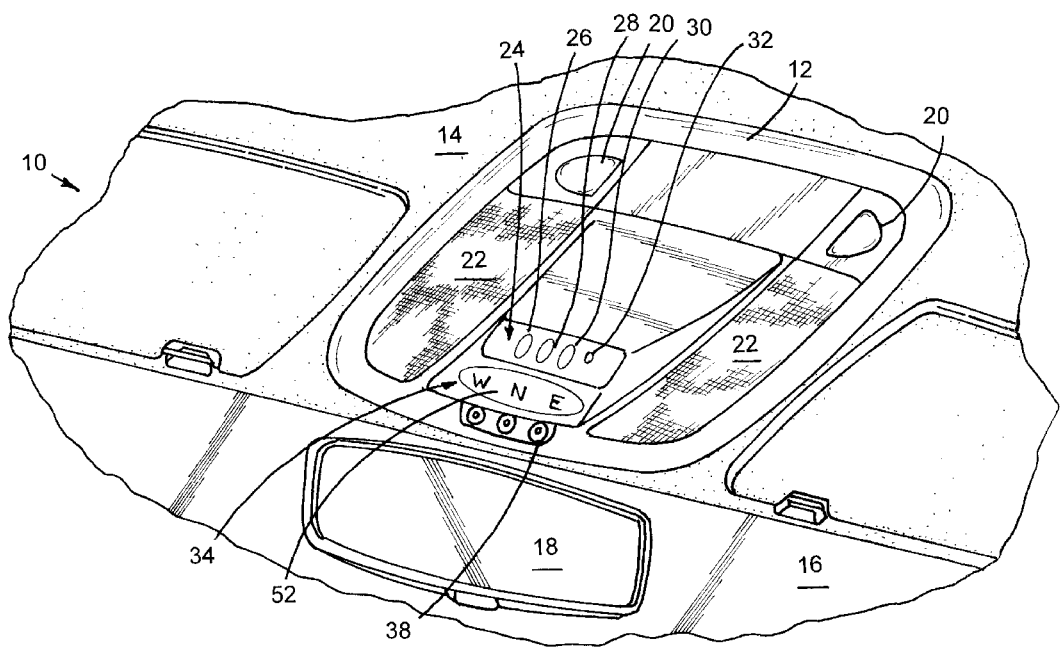
FIG. 1 is a fragmentary perspective view of a vehicle embodying the present invention.

In FIG. 1, there is shown a vehicle 10 such as an automobile which includes an overhead console 12 mounted to the roof 14 of the vehicle during manufacture, although it could be separately added at a later time. Console 12 is centered near the top edge of windshield 16 typically above the rearview mirror 18 and includes a pair of switches 20 for operating lamps positioned behind lenses 22 which in turn direct illumination into the lap area of either the driver or passenger side of the vehicle depending on which switch is actuated. The center of the console includes a trainable garage door opening transmitter 24 of the type disclosed in U.S. Pat. No. 5,442,340. This trainable transmitter can learn the RF frequency, modulation scheme, and security code for up to three existing remote transmitters. Thus, console 12 including trainable transmitter 24, can replace three separate remote control transmitters usually loosely stored in the vehicle. The transmitter includes three control switches 26, 28, and 30 and an indicator LED 32 for the display of training prompting and operating information to the vehicle operator. Console 12 also includes a display panel 34, the center of which includes a digital display 52 providing, in one embodiment of the invention, a sixteen point compass display of the vehicle heading. Console 12 also includes display control buttons 38 for selecting information to be displayed. Mounted in console 12 also is the compass circuit shown in FIG. 2.

Figure 2:
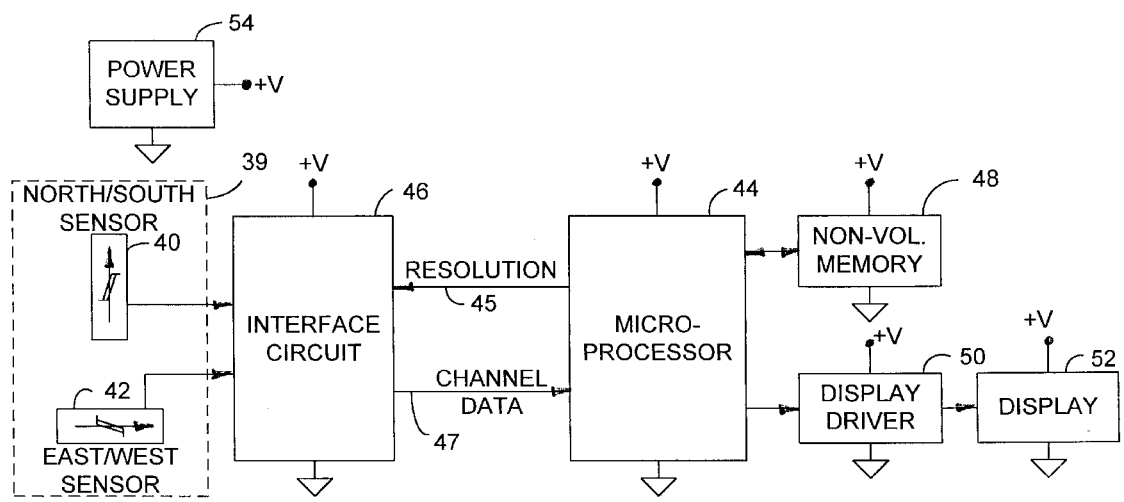
FIG. 2 is an electrical circuit diagram in block form of the compass system embodying the present invention.

Referring now to FIG. 2, the compass system of the present invention includes a magnetic field sensor 39 coupled to a microprocessor 44 through an electrical interface circuit 46. In the preferred embodiment, sensor 39 is comprised of individual sensors 40 and 42 which sense separate orthogonal components of the Earth's magnetic field, and microprocessor 44 is a HC05 8-bit microprocessor manufactured by the Motorola Corporation. Microprocessor 44 and circuit 46 are coupled via serial communication lines 45 and 47, and comprise a processing circuit for processing electrical signals supplied from sensors 40 and 42. Also coupled to microprocessor 44 in a conventional manner is a non-volatile memory circuit 48 for storing compass data, a display driver 50, and a display 52 for displaying heading information to the operator of the vehicle. Power supply circuit 54 provides operating voltage to the various electrical components of the compass system. The functioning and interconnection of these circuits is now described in greater detail.

Magnetic field sensors 40 and 42 sense the horizontal components of the magnetic field external to the vehicle. Sensor 42 senses the East/West or Channel 1 components of the field, and sensor 40 senses the North/South or Channel 2 components of the field. As is described below, the magnetic field sensed by sensor 40 is said to have a positive polarity if it is in the North direction, and is said to have a negative polarity if it is in the South direction. Similarly, the magnetic field sensed by sensor 42 is said to have a positive polarity if it is in the East direction, and is said to have a negative polarity if it is in the West direction. Although the reference to the sensing directions of the sensors as being North, South, East, and West is literally accurate only when the vehicle is travelling in North, these relative terms referring to direction are utilized hereinafter to refer to the component directions of the sensed external magnetic field. For example, sensor 40 is oriented to sense the component of the Earth's magnetic field existing along an axis corresponding to the vehicle's direction of travel and sensor 42 is oriented to sense a the component existing in a direction perpendicular to the vehicle's direction of travel.

In the preferred embodiment, sensors 40 and 42 are magneto-inductive sensors, each having a wire-wound high magnetic permeability core constructed of Metglas 2705M available from Allied Signal Corporation. Preferably, the core has dimensions of 0.020 inches×0.600 inches×0.001 inches, and is wound with approximately 2000 turns of 41 gauge AWG wire. As described in greater detail below, sensors 40 and 42 of the preferred embodiment serve as inductive elements in an oscillator circuit formed with portions of interface circuit 46, with the inductance of a particular sensor being dependent on the magnitude of the magnetic field in that sensor's direction of measurement. Through the generation of electrical signals having a frequency that varies with the external magnetic field, the vehicle direction can be ascertained. Although sensors 40 and 42 are magneto-inductive sensors in the preferred embodiment, other types of sensors, such as magneto-resistive sensors, can be implemented if appropriate changes are made to the compass system. In an alternate embodiment described below, sensors 40 and 42 may be also replaced by a flux-gate sensor.

Figure 3:
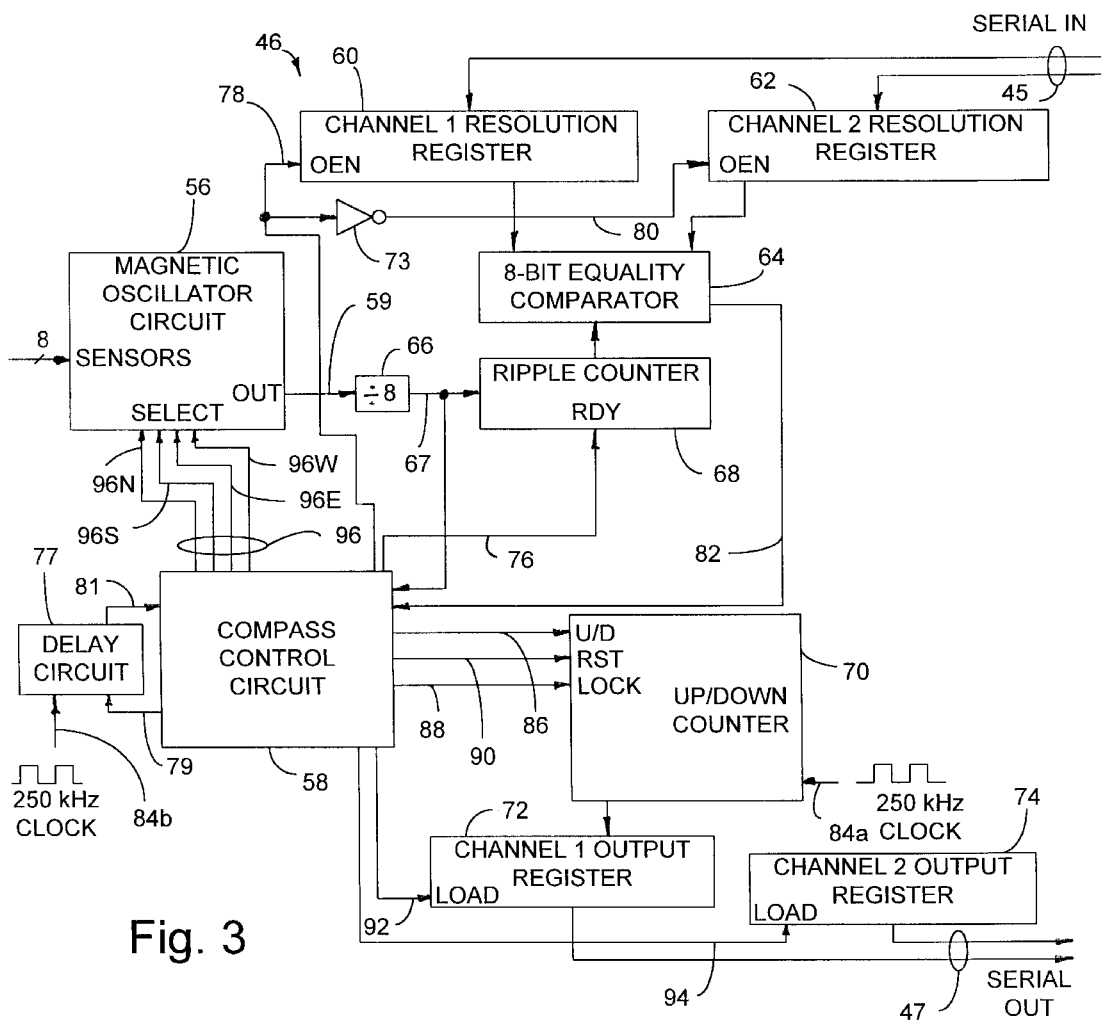
FIG. 3 is an electrical circuit diagram in block form of the interface circuit shown in FIG. 2.

Shown in FIG. 3 is interface circuit 46 which couples magneto-inductive sensors 40 and 42 to the microprocessor 44. In the preferred embodiment, circuit 46 includes a driver circuit 56, a compass control circuit 58, an 8-bit Channel 1 resolution register 60, an 8-bit Channel 2 resolution register 62, an 8-bit equality comparator 64, a division circuit 66, an 8-bit ripple counter 68, a 16-bit up/down counter 70, a 16-bit Channel 1 output register 72, and a 16-bit Channel 2 output register 74. The functioning and interconnection of these circuits is now described in greater detail.

Driver circuit 56 of interface circuit 46 and sensors 40 and 42 form an oscillator 57 in which sensors 40 and 42 serve as inductive elements and from which electrical signals are generated which represent the sensed magnetic field external to the vehicle. The structure of such a circuit is shown in FIG. 4 and disclosed in U.S. Pat. No. 5,239,264, issued on Aug. 24, 1993, entitled ZERO-OFFSET MAGNETOMETER HAVING COIL AND CORE SENSOR CONTROLLING PERIOD OF AN OSCILLATOR CIRCUIT, assigned to Precision Navigation, Inc., the disclosure of which is incorporated herein by reference. A brief description of the functioning of this circuit in connection with the other components of interface circuit 46 is now provided.

In order to obtain compass heading information, the output frequency of oscillator circuit 57 is dependent on the level of internal inductance of the sensors. Oscillator circuit 57 is configured such that each of sensors 40 and 42 serve as the inductive element of circuit 57 at alternating times, as described in the above-mentioned patent. The level of inductance provided by sensors 40 and 42, and thus the output frequency of circuit 57 is dependent on the magnitude and direction of the external magnetic field as well as the direction of the magnetic field created by the current fed to the sensor. As shown in FIG. 4, oscillator 57 includes a channel oscillator 57a for driving sensor 40 and a channel sensor 57b for driving sensor 42. Each channel oscillator 57a, 57b preferably includes a gating element 421 having AND gates 422 and 424 with inputs connected to the output of the channel oscillator and respective input enable lines 96N, 96S, 96E, and 96W that are coupled to compass control circuit 58. The outputs of AND gates 422 and 424 are respectively coupled to different ends of the sensors (40, 42) through impedance matched timing resistors 415 and 417. The two ends of each sensor 40, 42 are also connected the input of a Schmitt-trigger 411 via normally-open switches 430 and 431, respectively. Switches 430 and 431 are independently controlled by the enable signals output from compass control circuit 58. By closing switches 430 and 431 one at a time, compass control circuit 58 changes the bias polarity of the channel oscillators 57a and 57b causing the channel oscillators to change the end of the sensor to which a driving current is supplied. The bias polarity of channel oscillator 57a is deemed to be positive if it is biased to apply current to the North end of sensor 40, and is negative if it is biased so as to apply current to the South end of sensor 40. Similarly, the bias polarity of channel oscillator of 57b is deemed to be positive if it is biased to apply current to East end of sensor 42, and is negative if it is biased so as to apply current to the West end of sensor 42. As shown in FIG. 4, oscillator circuit 57 is configured so that each of sensors 40 and 42 can be fed current from either of their ends. The detailed operation of oscillator 57 is described in the U.S. Pat. No. 5,239,264.

The frequency of the signal output from oscillator circuit 57, which is dependent on the magnitude and direction of the external magnetic field and the bias polarity of the channel oscillator connected therein, has a base or zero magnetic field frequency when no magnetic field is present in the measurement direction of the connected sensor. With a positive bias polarity of channel oscillator 57a, the output frequency of oscillator 57 decreases from this base frequency when the magnetic field strength increases in the North (positive) direction, and increases from the base frequency when the magnetic field strength increases in the South (negative) direction. If the bias polarity of channel oscillator 57a is negative, then the output frequency of oscillator 57 increases from the base frequency when the magnetic field strength increases in the North (positive) direction, and decreases from the base frequency when the magnetic field strength increases in the South (negative) direction. When channel oscillator 57b has a positive bias polarity, the output frequency of oscillator 57 decreases from the base frequency when the magnetic field strength increases in the East (positive) direction, and increases from the base frequency when the magnetic field strength increases in the West (negative) direction. If the bias polarity of channel oscillator 57b is negative, then the output frequency of oscillator 57 increases from the base frequency when the magnetic field strength increases in the East (positive) direction, and decreases from the base frequency when the magnetic field strength increases in the West (negative) direction. Thus, by analyzing the output frequency of oscillator circuit 57 when a channel oscillator is biased at a known bias polarity and comparing that frequency to the base frequency, compass heading information may be obtained.

Interface circuit 46 analyzes the electrical signals provided by oscillator circuit 57 by determining for each channel oscillator, a frequency difference between signals output from oscillator 57 for each different bias polarity. Specifically, interface circuit 46 measures the output frequency by converting the electrical signals into data signals and determining the time period measured as the number of fixed duration "counts" required for the signals from oscillator circuit 57 to complete a particular number of cycles. The count value increases as the frequency of oscillation decreases. For each channel, interface circuit 46 measures the number of counts required for signals output from circuit 57 to complete a particular number of cycles for each bias polarity of the corresponding channel oscillator and determines a difference in the number of counts associated with the two different bias polarities of the corresponding channel oscillator. By calculating the difference between the count values associated with the positive and negative bias polarities of each channel oscillator, a zero-compensated count value, or data signal, is generated for each sensor. Such a count value represents the actual field strength in the measurement direction of a sensor, and is zero if the magnetic field is zero. As described in greater detail below, each count of these zero-compensated count values represents a particular level of magnetism, with the milligauss to count ratio of a count value determined by the number of cycles completed by oscillator circuit 57 for both bias polarities of the channel oscillator generating that zero-compensated count value. A description of the individual components of interface circuit 46 to implement the bias polarity switching method is now described.

Referring to FIG. 3, Channel 1 resolution register 60 is an 8-bit register that stores a value which determines the number of cycles to be completed by the output signal of oscillator circuit 57 for the measurement period of each bias polarity of channel oscillator 57b. Similarly, Channel 2 resolution register 62 is an 8-bit register that stores a value which determines the number of cycles to be completed for the measurement period of each bias polarity of channel oscillator 57a. As described below, these values determine the level of resolution achieved by the compass system, and may be adjusted by microprocessor 44 by means of adjustment signals via input line 45. Division circuit 66 receives the electrical signal generated by oscillator circuit 57 via line 59 and divides this signal by a particular number (eight in the preferred embodiment). The resulting signal is supplied to ripple counter 68 via line 67. Ripple counter 68 is an 8-bit counter that counts the number of cycles completed by the input signal received from division circuit 66. As described below, counter 68 counts the number of cycles completed for each bias polarity of the channel oscillators for each of sensors 40 and 42, with the counter being cleared before each counting period by means of connection to compass control circuit 58 via line 76. The electrical signal generated by oscillator circuit 57 is divided by circuit 66 before being input to counter 68, thus dividing the frequency of the signal by eight (in the preferred embodiment), because it is desirable to enable 8-bit ripple counter 68 (capable of counting to 255) to count more than the equivalent of 255 cycles of the original electrical signal. By counting more cycles, counter 68 enables the compass system to work with more averaged sensor information which is more reliable.

Equality comparator 64 of FIG. 3 is an 8-bit comparator which compares the value of ripple counter 68 with the stored value of whichever one of resolution registers 60 or 62 is enabled by compass control circuit 58 via lines 78 or 80. If the two compared values are equal, comparator 64 outputs a signal (REQUAL=1) to compass control circuit 58 via line 82. Up/down counter 70 is a 16-bit counter that serves to calculate the time period, or count value, required for a particular number of cycles to be completed by the output signal from oscillator circuit 57 which is eventually indicated by an output signal (REQUAL=1) from equality comparator 64 sent to circuit 58. As described below, counter 70 ultimately holds the difference between the count values measured during the two bias polarities of the channel oscillator for a particular sensor. Via input line 84, counter 70 counts according to a clock signal having a frequency which is selected such that counter 70 will not roll over (count beyond its measurement range) when making its time period calculations. In the preferred embodiment, the clock frequency is 250 KHz. The counting of counter 70 is controlled by its multiple connections with compass control circuit 58, with a signal (U/D) applied on the U/D input line 86 determining whether counter 70 counts up or down, a signal (ENABLE) applied on the Lock input line 88 enabling counter 70 to be locked at a particular measurement reading (for reasons discussed below), and a signal (CLEAR) applied to the RST input line 90 enabling counter 70 to be cleared. Channel 1 and Channel 2 output registers 72 and 74 are 16-bit registers and, depending on which is enabled by compass control circuit 58 via a signal (Latch_N) on line 92 or a signal (Latch_E) on line 94, one receives and stores the count value held in counter 70. This zero-compensated count value, or data signal, is available to microprocessor 44 via output line 47. Compass control circuit 58 is configured as a conventional state machine and controls the functioning of interface circuit 46. Using known software, those skilled in the art may readily determine the appropriate configuration of the state machine based upon the state diagram shown in FIG. 5 and the state table shown in FIG. 6. In addition to its connections described above, circuit 58 enables oscillator circuit 57 to cycle through each of its four modes of operation (positive and negative oscillation polarities of each of sensors 40 and 42) by means of connection to SELECT input lines 96 of driver circuit 56. The operation of compass control circuit 58 is now described with reference to FIGS. 5 and 6.

In operation, compass control circuit 58 of interface circuit 46 initiates a measurement of the external magnetic field by causing oscillator circuit 57, via SELECT line 96, to enter its first mode of operation. Although either of sensors 40 and 42 may be connected to oscillator circuit 57 in the first mode, let us assume that the first mode of operation involves sensor 40 (Channel 2). In this first state designated as "0000" in FIG. 5, compass control circuit 58 outputs the control signals shown for that state in the state table shown in FIG. 6. Specifically, circuit 58 outputs a signal (INDELAY=0) to a delay circuit 77 via line 79. Delay circuit 77 supplies a signal (ODELAY=0) to circuit 58 via line 81 until it counts a predetermined number of clock pulses of a 250 kHz clock signal applied to delay circuit 77 via line 84*b*. In state 0000, circuit 58 enables channel oscillator 57*a* with a positive bias by applying a signal (CHL_N=1) via line 96N. In addition, compass control circuit 58 causes ripple counter 68 to be cleared by applying a signal (RCLEAR=1) via line 76, enables up/down counter 70 by applying a signal (ENABLE=1) on line 88, causes counter 70 to enter the "counting up" mode of operation by supplying a signal (U/D=0) via line 86, and enables Channel 2 resolution register 62 by applying an inverted signal (RENABLE_E= 0) via an invertor 73 and line 80 (while maintaining Channel 1 resolution register 60 in a disabled state by supplying the non-inverted signal (RENABLE_E=1) via line 78). When delay circuit 77 reaches the predetermined count level, it supplies a signal (ODELAY=1) to circuit 58 via line 81. Upon receiving the signal (ODELAY=1) from delay circuit 77, circuit 58 enters a second state designated as "0001" in FIG. 5. In this second state, circuit 58 outputs the control signals shown for this state in state table (FIG. 6). In this second state, circuit 58 releases ripple counter 68 to start counting by supplying a signal (RCLEAR=0) via line 76 and resets and holds delay circuit 77 by supplying a signal (INDELAY=1) via line 79. Circuit 58 remains in this second state only until a first pulse (MAG_OSC=1) is detected as being output from dividing circuit 66 on line 67.

Figure 5:
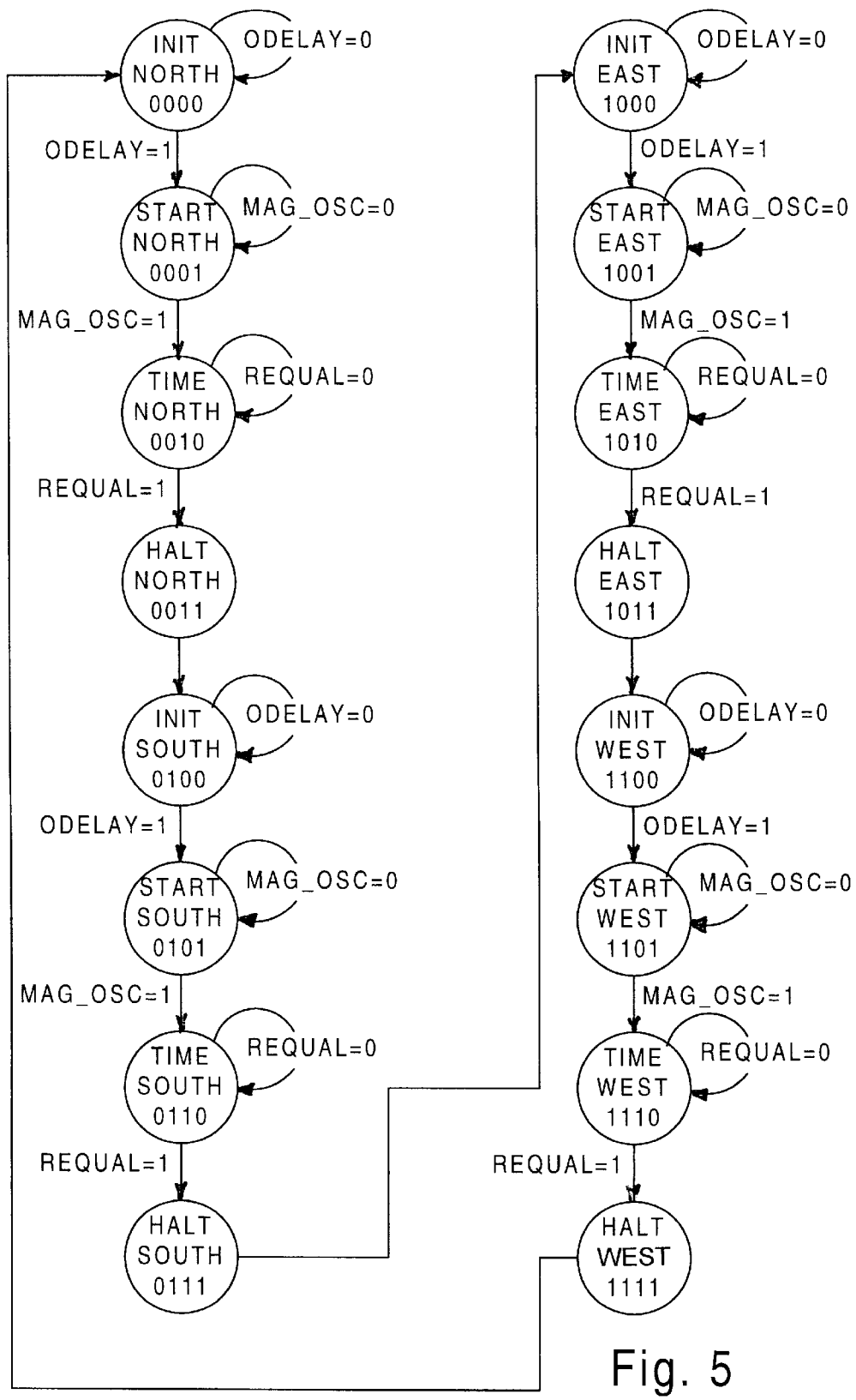
FIG. 5 is a state diagram illustrating the order in which the state machine constituting the compass control circuit, changes between operating states.

In the third state designated as "0010" in FIG. 5, compass control circuit 58 outputs a signal (CLEAR=1) to the reset terminal of up/down counter 70 via line 90 and a signal (ENABLE=0) to the lock terminal of up/down counter 70 via line 88 in order to cause up/down counter 70 to begin counting the input clock pulses supplied via line 84*a*. In the first mode of operation (states 0001 and 0010), channel oscillator circuit 57*a* is biased in the positive polarity, with the frequency of the resulting electrical signal dependent on the magnitude and direction of the external magnetic field (as described above). As oscillator circuit 57 outputs an oscillating signal the number of cycles of the electrical signal (divided by eight) is counted by ripple counter 68 while up/down counter 70 counts up so as to keep track of the elapsed time period. When equality comparator 64 determines that the number of cycles counted by ripple counter 68 is equal to the value stored in Channel 2 resolution register 62, it supplies an output signal (REQUAL=1) to compass control circuit 58 via line 82. This output signal causes circuit 58 to enter a fourth state designated as "0011" in FIG. 5. In this fourth state, compass control circuit 58 changes the output (CHL_N=0) supplied to oscillator 57 on line 96N to cause channel oscillator 57*a* to stop providing an output signal. Also, circuit 58 outputs a signal (ENABLE=1) on line 88 to lock counter 70 at the time period (count value) counted to that point, outputs a signal (U/D=1) on line 86 to cause counter 70 to enter the "counting down" mode of operation, and outputs a signal (RCLEAR=1) on line 76 to clear ripple counter 68.

Next, compass control circuit 58 enters a fifth state designated as "0100" in FIG. 5 in which it outputs a signal (INDELAY=0) on line 79 causing delay circuit 77 to begin timing the predetermined initialization period. Circuit 58 also outputs a signal (CHL_S=1) on line 96S causing oscillator circuit 57 to enter its second mode of operation in which channel oscillator circuit 57*a* is negatively biased. Once the predetermined delay has expired, compass control circuit 58 enters similar states as previously described and outputs essentially the same control signals in the same sequence except the up/down counter 70 counts down and channel oscillator 57*a* is negatively biased. As oscillator circuit 57 generates an oscillating signal, the number of cycles of the resulting electrical signal (divided by eight) is counted by ripple counter 68 while up/down counter 70, now in an unlocked state, counts down from the stored time period (count value) counted when channel oscillator 57*a* was positively biased. When equality comparator 64 determines that the number of cycles completed by the electrical signal generated by oscillator circuit 57 (divided by 8) is again equal to the value stored in Channel 2 resolution register 62, then an output signal (REQUAL=1) is again supplied to compass control circuit 58 via line 82. This output signal causes circuit 58 to change states again and lock counter 70 via line 88, with the count value then stored in counter 70 being the two's compliment time difference between the two measurement periods. This count value is the zero-compensated output, or data signal, described above and represents the actual field strength in the measurement direction of sensor 40. If the first measurement period is longer than the second measurement period such that counter 70 does not roll over, then the external magnetic field in the measurement direction of sensor 40 has a positive (North) polarity, and the count value is a positive number. If the second measurement period is longer than the first measurement period such that counter 70 rolls over, then the external magnetic field in the measurement direction of sensor 40 has a negative (South) polarity, and the count value is a negative number. If the two measurement periods are equal, then the count value and the magnitude of the external magnetic field in the measurement direction of sensor 40 are both zero. The zero-compensated count value, or data signal, stored in counter 70 at the end of the second measurement period is supplied to Channel 2 output register 74 which can be read by microprocessor 44 via line 47.

The output signal (REQUAL=1) supplied by equality comparator 64 via line 82, which causes compass control circuit 58 to change states and to lock counter 70 after the second measurement period, also causes circuit 58 to place counter 70 in the "counting up" mode of operation via line 86, to clear ripple counter 68 and (eventually) up/down counter 70 via lines 76 and 90, and to enable Channel 1 resolution register 60 via line 78 (while now maintaining Channel 2 resolution register 62 and Channel 2 output register 74 in a disabled state via lines 80 and 94). Compass control circuit 58 then causes oscillator circuit 57, via SELECT line 96E, to enter its third mode of operation in which channel oscillator 57b is enabled and positively biased. The process continues as described above until the fourth mode of operation of oscillator circuit 57 is completed (in which channel oscillator 57b is negatively biased) and a zero-compensated count value, or data signal, is supplied to Channel 1 output register 72 which can be read by microprocessor 44 via line 47. This count value is a positive number if the external magnetic field in the measurement direction of sensor 42 has a positive (East) polarity, is a negative number if the magnetic field has a negative (West) polarity, and is zero if the magnitude of the magnetic field is zero. The above process then repeats itself for the next measurement of the external magnetic field.

Figure 7A:
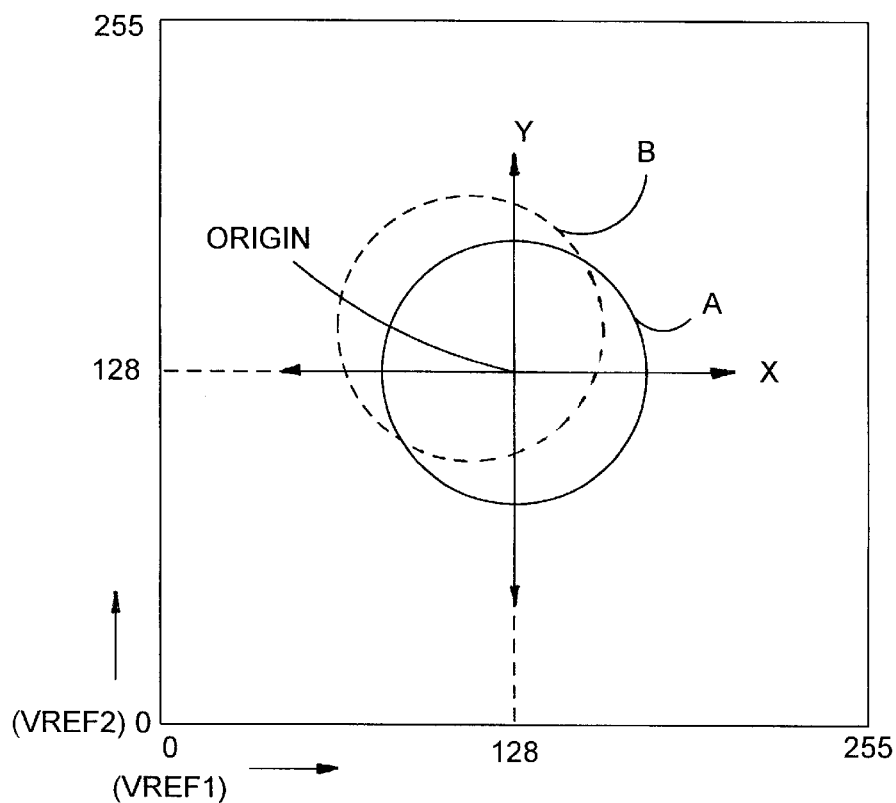
FIGS. 7A and 7B are graphs illustrating the preferred measurement range system of the present invention, the ideal signal representing the sensed magnitude and direction of the earth's magnetic field, and the signal after a change in vehicle magnetism.

The zero-compensated count values, or data signals, generated by interface circuit 46 and provided to microprocessor 44, representing the sensed magnitude and direction of the magnetic field in the measurement direction of each of sensors 40 and 42, can be plotted on an X-Y coordinate plane, as shown in FIG. 7A. The magnetic field in the East/West measurement direction of sensor 42 is represented by the X-axis, and the magnetic field in the North/South measurement direction of sensor 40 is represented by the Y-axis. For a properly calibrated compass, the plot of compass count values creates a perfect circle around the origin of the coordinate plane when the vehicle travels in a 360° loop as indicated by graph A of FIG. 7A. The radius of the circle represents the earth's magnetic field strength, and the vehicle's compass heading at a particular time during travel is represented by a point on the circle, which is identified by the sensed orthogonal components lying on the X and Y axes. By calculating the angle which the point forms with the X-Y coordinate plane, the compass heading of the vehicle may be determined.

It should be noted that the plot of zero-compensated count values, or data signals, will be affected if there is a change in vehicular magnetism. Such a change will cause the magnetic field sensed by the compass channels when the vehicle is heading in a given direction to be either greater or lesser than that expected for a vehicle with no magnetic interference. As a result, the plot of count values will be shifted away from the origin of the coordinate plane in some direction, resulting in a circle such as graph B of FIG. 7A when the vehicle travels a 360° loop. As is described below, microprocessor 44 corrects for any vehicular magnetism by manipulating the parameters of the measurement range system so that the origin of the coordinate plane coincides with the center of the plotted circle. It should also be noted that the plot of zero-compensated count values may be elliptical in nature instead of a perfect circle as shown as graph D in FIG. 7B. The reason for such an elliptical effect is that the construction of the vehicle generally results in more vehicle mass along one axis of compass sensing which causes the earth's field to penetrate the vehicle differently in different directions. This causes the compass channels to not react uniformly to the earth's field as the vehicle travels in a 360° path of travel. As is described below, an elliptical plot of zero-compensated count values may be corrected to provide a circular plot, wherefrom a heading angle of the vehicle may be calculated, by adjusting the resolution of the compass system.

As mentioned above, oscillator circuit 57 generates a signal that oscillates for a predetermined number of cycles for the measurement period of each bias polarity of each of channel oscillators 57a and 57b. The values stored in Channel 1 and Channel 2 resolution registers 60 and 62 determine the number of cycles to be completed. Because of the inclusion of division circuit 66, the number of cycles completed by the output signal of circuit 57 for each bias polarity of the channel oscillators is equal to the value stored in the resolution register (corresponding to that sensor) multiplied by 8. Interface circuit 46 calculates a zero-compensated count value for each of sensors 40 and 42, with each count of these zero-compensated count values representing a particular amount of magnetism. The milligauss to count ratio of a zero-compensated count value is determined by the number of cycles completed by the output signal from oscillator circuit 57 for both bias polarities of the channel oscillators generating that count value, with the exact relationship (dependent on the construction of the sensor and the clock frequency of counter 70) capable of being ascertained by experimental means. Thus, by enabling microprocessor 44 to change the values stored in registers 60 and 62 by means of adjustment signals via line 45, the milligauss to count ratio of the zero-compensated count values can be increased or decreased.

By adjusting the milligauss to count ratio, the circular plot of count values and the resolution of the compass system can be changed. For example, let us assume that the measurement period for each bias polarity of the channel oscillators consists of 100 cycles of the signal output from division circuit 66 (corresponding to a value of 100 stored in resolution register 60 or 62 which equates to 800 cycles of oscillator circuit 57) and that this corresponds to a zero-compensated count value, or data signal, having a milligauss to count ratio of 4:1. In this situation, a change in the actual field strength of four milligauss will change the zero-compensated count value by one count. If the number of cycles of the signal output from division circuit 66 is doubled to 200 cycles for the measurement period for each bias polarity of the channel oscillator of the same sensor (by storing the value of 200 in the appropriate resolution register), then counter 70 will count twice as many counts for each bias polarity of the channel oscillators. As such, the difference between the count values for the two bias polarities, the zero-compensated count value, will be twice as large for the same magnitude of magnetism. This will cause the milligauss to count ratio of the zero-compensated count value to be halved such that each count will correspond to two milligauss of magnetism instead of four. As such, the number of zero-compensated count values into which the electrical signals from oscillator circuit 57 can be resolved is increased, and the span of the plot of count values in the measurement direction of the particular sensor is twice as large. Similarly, if the number of cycles of the signal output from division circuit 66 is halved from the original 100 cycles to 50 cycles for the measurement period for each bias polarity of the channel oscillators (by storing the value of 50 in the appropriate resolution register), then counter 70 will count half as many counts for each bias polarity of the channel oscillators, and the zero-compensated count value will be half as large for the same magnitude of magnetism. This will cause the milligauss to count ratio of the zero-compensated count value to be doubled such that each count will correspond to eight milligauss of magnetism instead of four. As such, the number of zero-compensated count values into which the electrical signals from oscillator circuit 57 can be resolved is decreased, and the span of the plot of count values in the measurement direction of the particular sensor is half as large.

If the number of cycles to be completed by the signal generated by oscillator circuit 57 for the measurement period for each bias polarity of the channel oscillators is changed by changing the values stored in both of resolution registers 60 and 62 by means of adjustment signals from microprocessor 44 via line 45, then the size of the entire circular plot of count values will be adjusted. Specifically, if the number of cycles for the measurement period of each sensor is increased, then the resolution of the compass system and the size of the circular plot will be increased from plot E to plot C in FIG. 7B, for example. If the number of cycles for the measurement period of each sensor is decreased, then the resolution of the compass system and the size of the circular plot will be decreased from plot F to plot C in FIG. 7B, for example. In the preferred embodiment, the programming for microprocessor 44 attempts to maintain the span of count values in the measurement direction of each sensor (and thus the size of the circular plot) at a constant value (stored in memory) by manipulating the values stored in resolution registers 60 and 62 by means of adjustment signals via line 45 to account for changes in the magnitude of the sensed magnetic field of the earth. (Alternatively, the spans of count values may be kept between two stored threshold values.) As described above, the earth's magnetic field, comprised of both horizontal and vertical components, is mostly horizontal near the equator and progressively becomes more vertical as one travels into the northern or southern latitudes. Because sensors 40 and 42 are oriented to sense the horizontal components of the earth's magnetic field, the magnitude of the sensed magnetic field is greatest near the equator and progressively tapers off as a vehicle travels into the northern or southern latitudes. As such, the adjustment signals of microprocessor 44 increase the number of cycles for the measurement period of each sensor, thus enlarging the circle, when the vehicle travels away from the equator, and decrease the number of cycles for measurement period of each sensor, thus reducing the circle, when the vehicle travels towards the equator. As described above, it is very beneficial to enlarge the circular plot when the vehicle travels into the far northern or southern latitudes of the earth. This causes the circular plot to be comprised of more count values which can be resolved into more angles from which the heading of the vehicle is calculated. This enables more accurate heading information to be provided in such environments.

Figure 7B:
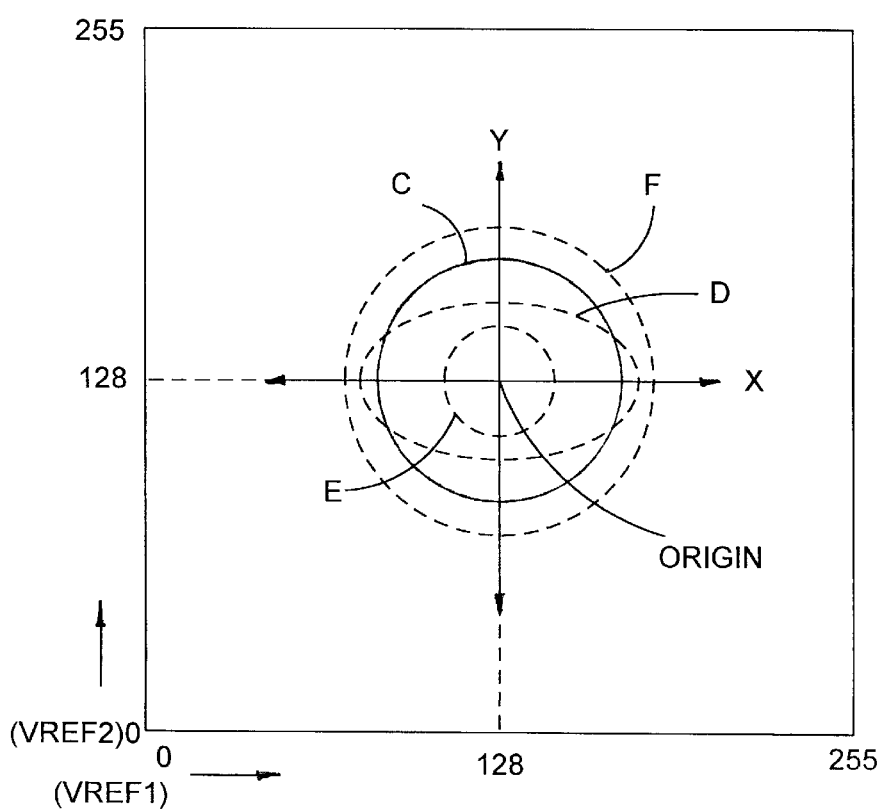

In addition to compensating for changes in the magnitude of the sensed magnetic field of the earth, the above process is useful when the plot of count values is initially elliptical in nature instead of the perfect circle of graph C of FIG. 7B. By adjusting the span of count values in the measurement direction of each sensor so as to move them closer to the same stored value (or closer to being between two stored threshold values), the elliptical plot (graph D) is transformed into a circular plot (graph C) wherefrom a heading angle of the vehicle may be calculated. Such a correction is usually needed only once when the compass system is first energized.

It is important to note that changing the values stored in resolution registers 60 and 62 by means of adjustment signals via line 45 accomplishes much more than just a multiplication of the zero-compensated count values by a particular factor. Such a multiplication, although changing the size of the plotted circle, would not increase or decrease the number of zero-compensated count values into which the electrical signals from oscillator circuit 57 are capable of being resolved. Instead, the number of count values making up the plot of the new circle would be the same as the original circle and would be capable of being resolved into the same number of angles from which the heading of the vehicle is calculated. By not enabling the resolution of the compass system to be increased, multiplication of the count values would not enable more accurate heading information to be provided when the magnitude of the sensed magnetic field of the earth is very small.

In the preferred embodiment of the present invention, the programming of microprocessor 44 is similar in many respects to that disclosed in U.S. Pat. No. 4,953,305, assigned to the present assignee and incorporated herein by reference. For example, microprocessor 44 is programmed to enable the compass system to be automatically and continuously calibrated to account for changes in vehicular magnetism. As described in greater detail below, this calibration includes the collecting and centering of count values representing 120 milligauss spans (beginning stages of calibration), the collecting and centering of count values representing the first plotted circle, and the collecting and centering of count values representing subsequent plotted circles (continuous calibration). Furthermore, microprocessor 44 is programmed to monitor changes in the compass channel count values which are greater than the expected change caused by turning of the vehicle and which may be attributable to transient magnetic signals. However, in addition to the inclusion of programming steps implementing the variable resolution method discussed above, the programming of the preferred embodiment of the present invention is different from that of the above-mentioned patent in that it does not calibrate by means of the generation of feedback or compensation signals to adjust the sensor range of measurement. The system of the above-mentioned patent required this type of "hardware" correction because of the limitations in the dynamic operating range of the measurement system disclosed therein. The dynamic operating range of the measurement system of the present invention, by means of working with 16-bit information, is large enough such that calibration is achieved purely by software corrections in which variables are adjusted according to offset values stored in memory. A detailed description of the programming for microprocessor 44 to provide this system operation is now provided in connection with the flow charts of FIGS. 8–18.

In discussing the flow charts of FIGS. 8–18 for the programming of microprocessor 44, the following symbols and their definitions are used:

CHANNEL1DATA: a 16-bit buffer used to store the 16-bit zero-compensated count value representing the measurement of the earth's magnetic field as sensed by sensor 42.

CHANNEL2DATA: a 16-bit buffer used to store the 16-bit zero-compensated count value representing the measurement of the earth's magnetic field as sensed by sensor 40.

CSTAT: a 3-bit variable which stores the calibration status of the compass system as follows:

CSTAT=0: initialize for calibration

CSTAT=1: collect and center 120 milligauss spans

CSTAT=2: collect crossings for first circle

CSTAT=3: process first circle

CSTAT=4: collect crossings for second circle (and subsequent circles)

CSTAT=5: process second circle (and subsequent circles)

VREF1: a 16-bit variable which stores the count value which is 128 counts less than the center of the measurement range of East/West sensor 42. This variable is used to adjust the measurement range of Channel 1 in accordance with changes in vehicular magnetism.

VREF2: a 16-bit variable which stores the count value which is 128 counts less than the center of the measurement range of North/South sensor 40. This variable is used to adjust the measurement range of Channel 2 in accordance with changes in vehicular magnetism.

CHANNEL1READING: an 8-bit buffer which stores the 8-bit result when variable VREF1 is subtracted from buffer CHANNEL1DATA.

CHANNEL2READING: an 8-bit buffer which stores the 8-bit result when variable VREF2 is subtracted from buffer CHANNEL2DATA.

SUM1: an 8-bit buffer which stores a cumulative sum of the values stored in buffer CHANNEL1READING.

SUM2: an 8-bit buffer which stores a cumulative sum of the values stored in buffer CHANNEL2READING.

CHANNEL1MAX: an 8-bit variable which stores the maximum value stored in buffer CHANNEL1READING.

CHANNEL2MAX: an 8-bit variable which stores the maximum value stored in buffer CHANNEL2READING.

CHANNEL1MIN: an 8-bit variable which stores the minimum value stored in buffer CHANNEL1READING.

CHANNEL2MIN: an 8-bit variable which stores the minimum value stored in buffer CHANNEL2READING.

SPANFLAG1: a bit that is set if the span between the values stored in variables CHANNEL1MAX and CHANNEL1MIN corresponds to at least 120 milligauss.

SPANFLAG2: a bit that is set if the span between the values stored in variables CHANNEL2MAX and CHANNEL2MIN corresponds to at least 120 milligauss.

CHANNEL1SPAN: an 8-bit variable which stores the difference between the value stored in variable CHANNEL1MAX and the value stored in variable CHANNEL1 MIN.

CHANNEL2SPAN: an 8-bit variable which stores the difference between the value stored in variable CHANNEL2MAX and the value stored in variable CHANNEL2MIN.

IDEALSPAN: an 8-bit constant which represents the desired value of both of variables CHANNEL1SPAN and CHANNEL2SPAN. This constant is equal to 160 counts in the preferred embodiment.

CHANNEL1MIDPOINT: an 8-bit variable which stores the average of the values stored in variables CHANNEL1MAX and CHANNEL1MIN.

CHANNEL2MIDPOINT: an 8-bit variable which stores the average of the values stored in variables CHANNEL2MAX and CHANNEL2MIN.

RESOLUTION1: an 8-bit variable which stores the value supplied to Channel 1 resolution register 60 which determines the number of cycles completed by the output signal generated by oscillator circuit 57 when sensor 42 is the inductive element.

RESOLUTION2: an 8-bit variable which stores the value supplied to Channel 2 resolution register 62 which determines the number of cycles completed by the output signal generated by oscillator circuit 57 when sensor 40 is the inductive element.

NEWRESOLUTION1: an 8-bit variable which stores the number of cycles (divided by 8) which the output signal generated by oscillator circuit 57 would have to complete (when sensor 42 is the inductive element) in order for the subsequent value of variable CHANNEL1SPAN to equal the value of constant IDEALSPAN if the magnetic field strength in the measurement direction of Channel 1 was to remain constant.

NEWRESOLUTION2: an 8-bit variable which stores the number of cycles (divided by 8) which the output signal generated by oscillator circuit 57 would have to complete (when sensor 40 is the inductive element) in order for the subsequent value of variable CHANNEL2SPAN to equal the value of constant IDEALSPAN if the magnetic field strength in the measurement direction of Channel 2 was to remain constant.

RESOLUTION1TEMP: an 8-bit variable which stores the current non-adjusted value of variable RESOLUTION1.

RESOLUTION2TEMP: an 8-bit variable which stores the current non-adjusted value of variable RESOLUTION2.

QUOTIENT1: a variable which stores the quotient resulting from the division by 4 of the difference between the values in variables RESOLUTION1 and NEWRESOLUTION1.

QUOTIENT2: a variable which stores the quotient resulting from the division by 4 of the difference between the values in variables RESOLUTION2 and NEWRESOLUTION2.

UPPERCROSSINGFLAG: a bit that is set if the new crossing value stored in buffer CHANNEL1READING or buffer CHANNEL2READING is greater than the center of the measurement range of a channel (128 counts).

LOWERCROSSINGFLAG: a bit that is set if the new crossing value stored in buffer CHANNEL1READING or buffer CHANNEL2READING is less than the center of the measurement range of a channel (128 counts).

twit: a term used to describe when buffer CHANNEL1READING or buffer CHANNEL2READING has undergone a significant change in value which is greater than the expected change caused by turning of the vehicle.

twit counter: a counter which keeps track of the number of consecutive times that either buffer CHANNEL1READING or buffer CHANNEL2READING indicate a twit.

TWITVALUE1: an 8-bit variable which stores the most recent value of buffer CHANNEL1READING that did not indicate a twit.

TWITVALUE2: an 8-bit variable which stores the most recent value of buffer CHANNEL2READING that did not indicate a twit.

TWITCONSTANT: an 8-bit constant against which the difference between the values stored in buffer CHANNEL1READING and variable TWITVALUE1 or the difference between the values stored in buffer CHANNEL2READING and variable TWITVALUE2 is compared to determine whether a twit is present.

TWITFLAG: a bit that is set if the difference between the values stored in buffer CHANNEL1READING and variable TWITVALUE1 or the difference between the values stored in buffer CHANNEL2READING and variable TWITVALUE2 is greater than constant TWITCONSTANT such that a twit is present.

Two of the variables employed in the programming of microprocessor 44 are of particular interest in understanding the automatic and continuous calibration of the compass system. Variable VREF1 stores the count value which is (preferably) 128 counts less than the center of the 16-bit Channel 1 data. Variable VREF2 stores the count value which is (preferably) 128 counts less than the center of the 16-bit Channel 2 data. By subtracting the values of these 16-bit variables from the 16-bit two's compliment compass data in buffers CHANNEL1DATA and CHANNEL2DATA, 8-bit compass data is obtained which consists only of positive values and which is stored in 8-bit buffers CHANNEL1READING and CHANNEL2READING. The result is a count value (data signal) measurement range system for the compass system as shown in FIG. 7 which is convenient to work with in the programming of microprocessor 44. This preferred measurement range system measures 8-bit count values (data signals) ranging from 0–255 counts in each measurement direction, and has the X-Y coordinate plane associated with the circular plot of count values positioned in its center. Furthermore, this preferred measurement range system is situated within the larger measurement range system defined by the 16-bit two's compliment compass data in buffers CHANNEL1DATA and CHANNEL2DATA, with the exact positioning (0,0 point) determined by the 16-bit count values stored in variables VREF1 and VREF2. The values stored in variables VREF1 and VREF2, and thus the positioning of the preferred measurement range system, are adjusted to account for changes in vehicular magnetism throughout the operation of the compass system so that the center of the preferred measurement range system coincides with the center of the circular plot of count values.

Figure 8:
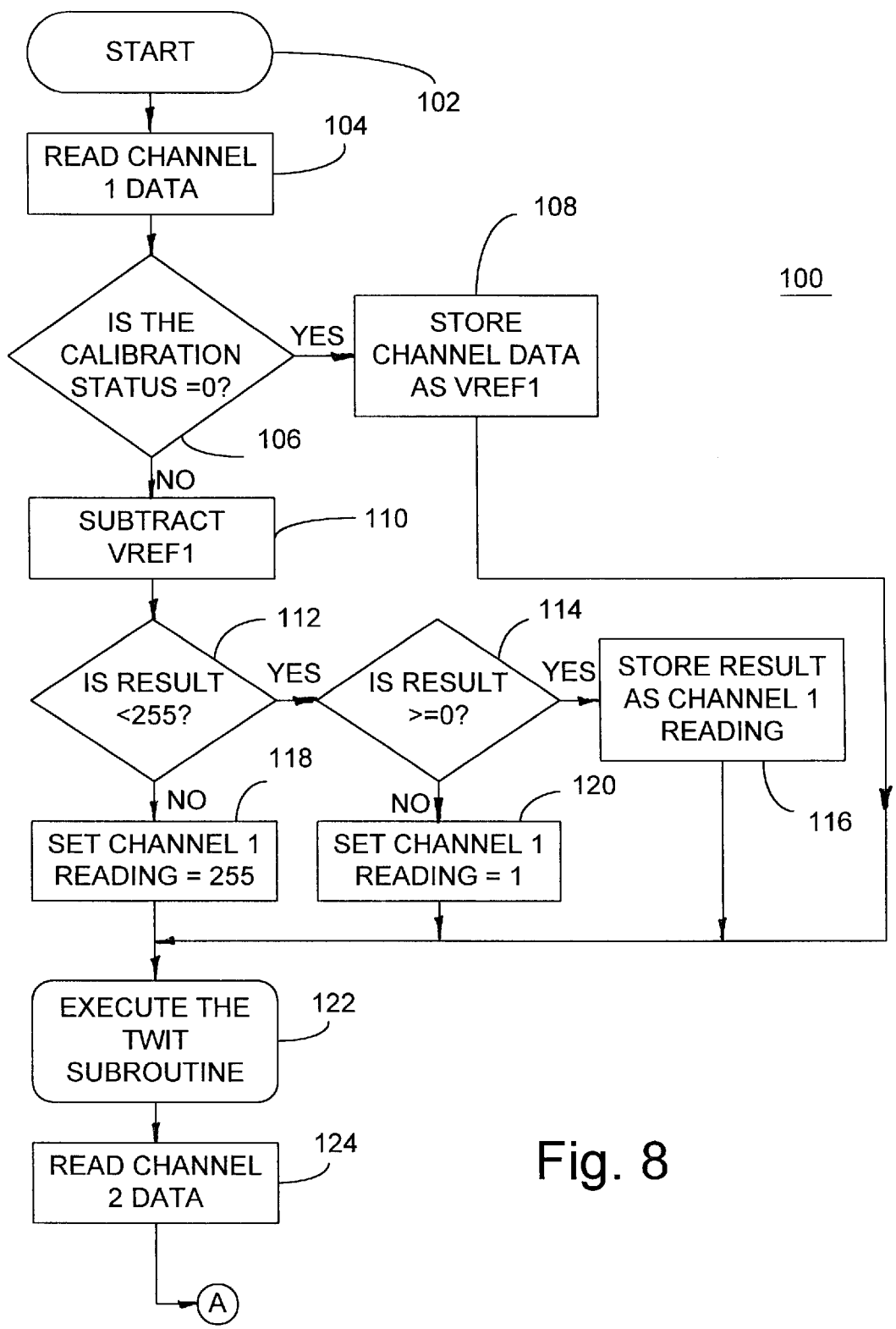
FIGS. 8–18 are the flow diagrams for the programming of the microprocessor employed in the compass system of the preferred embodiment of the present invention.
Figure 9:
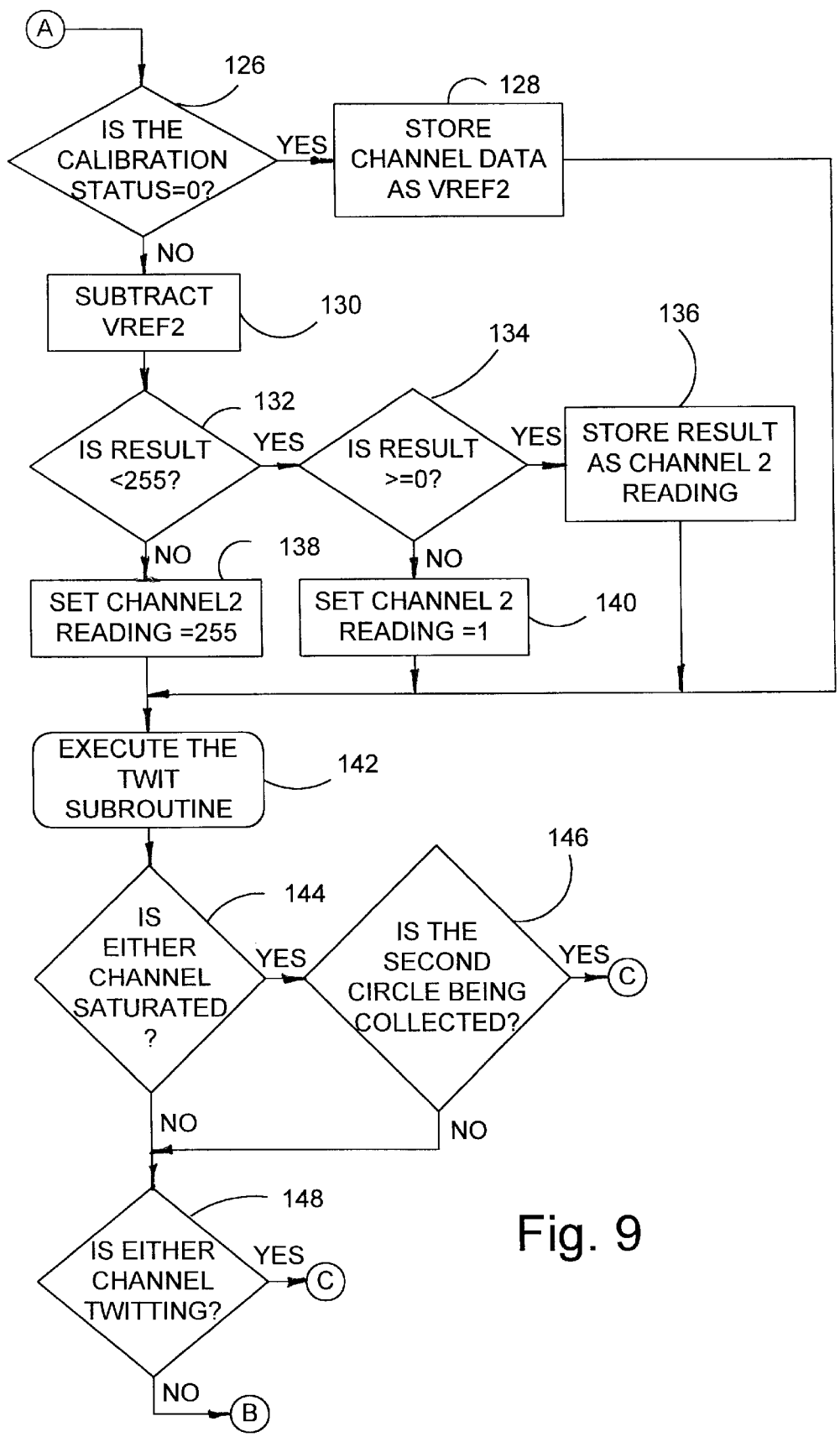
Figure 10:
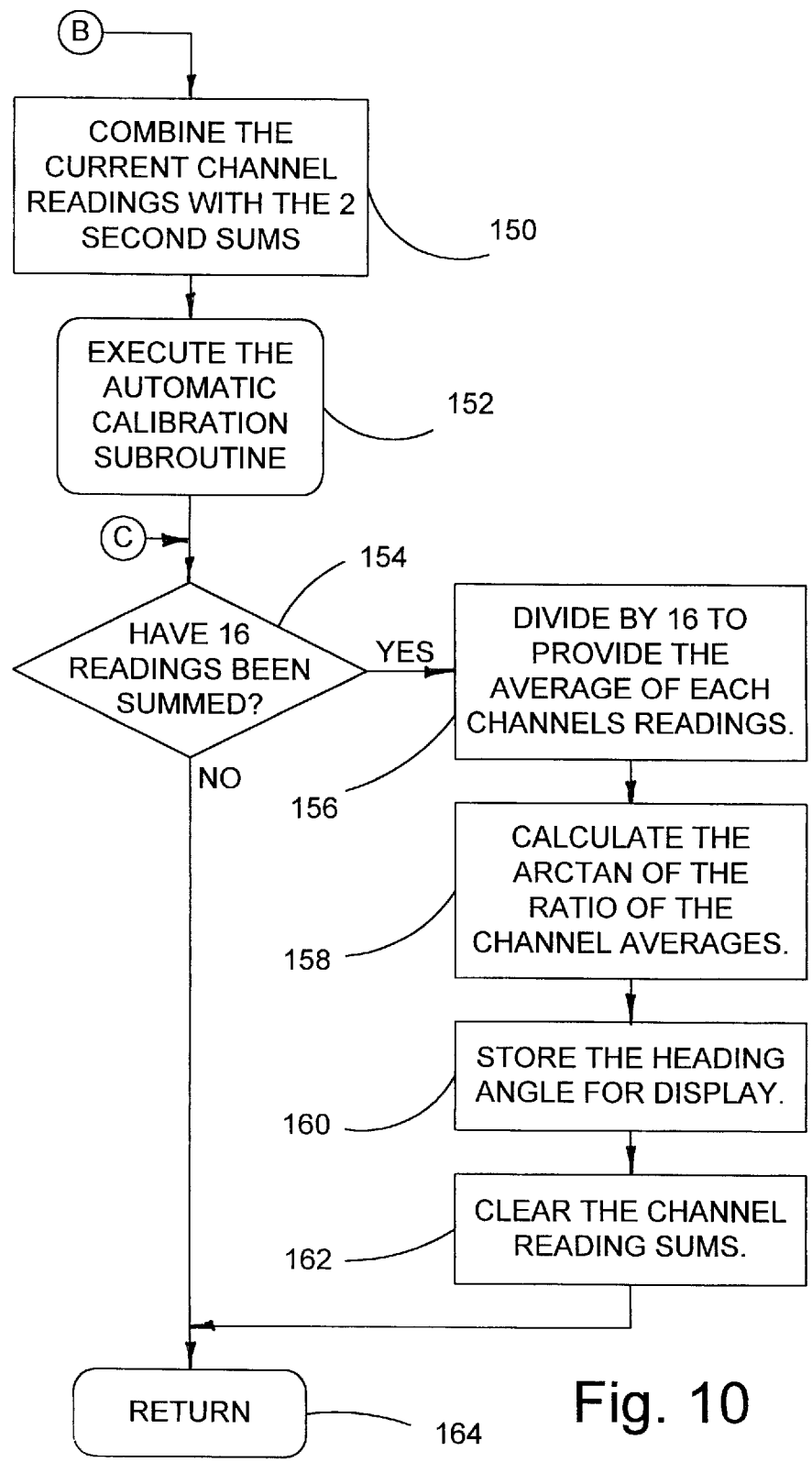

Referring first to FIGS. 8–10, shown is the main routine 100 of the programming of the compass system which is called every one-eighth second by microprocessor 44. Before main routine 100 is executed upon first power-up of the compass system, it should be noted that resolution registers 60 and 62 are loaded with the experimentally obtained number of cycles of the output signal generated by oscillator circuit 57 (divided by 8) that correspond to a 4 milligauss to count ratio. After block 102 of FIG. 5 which signifies the beginning of the main routine, block 104 causes microprocessor 44 to collect Channel 1 data from the Channel 1 output register 68 of interface circuit 46 representing the sensor 42 compass data. This data is the 16-bit zero-compensated count value representing the earth's magnetic field in the East/West measurement direction, and is stored in 16-bit buffer CHANNEL1DATA. Next, block 106 determines if the calibration status, stored in variable CSTAT, is equal to zero. The calibration status is equal to zero only when it is the first time through the main compass routine such that the system must be initialized for calibration. If block 106 determines that variable CSTAT is zero, then the program proceeds to block 108 in which the 16-bit compass data of buffer CHANNEL1DATA is stored in the 16-bit variable VREF1. After block 108, the program proceeds to block 122. If block 106 determines that variable CSTAT is not equal to zero, then block 110 subtracts the value of variable VREF1 from the Channel 1 data of buffer CHANNEL1DATA. After block 110, block 112 determines if the difference between the Channel 1 data and variable VREF1 is less than 255. If not, then the Channel 1 data is saturated (above an upper limit), and block 118 sets 8-bit buffer CHANNEL1READING equal to 255, after which the program proceeds to block 122. If block 112 determines that the difference between the Channel 1 data of buffer CHANNEL1DATA and variable VREF1 is less than 255, then block 114 determines if the difference is greater than or equal to zero. If not, then the Channel 1 data is saturated (below a lower limit), and block 120 sets buffer CHANNEL1READING equal to 1 after which the program proceeds to block 122. If block 114 determines that the difference between the Channel 1 data and variable VREF1 is greater than or equal to zero, then block 116 stores the difference, which is thus within the compass saturation limits, into buffer CHANNEL1READING, and the program proceeds to block 122. Block 122 executes the TWIT subroutine 166 which is described in greater detail below in connection with FIGS. 11 and 12. The TWIT subroutine 166 checks if the value of buffer CHANNEL1READING has undergone a significant change which is greater than the expected change caused by turning of the vehicle. Upon return from the TWIT subroutine 166, the program proceeds to block 124 which causes microprocessor 44 to collect Channel 2 data from the Channel 2 output register 70 of interface circuit 46 representing the sensor 40 compass data. This data is the 16-bit zero-compensated count value representing the earth's magnetic field in the North/South measurement direction, and is stored in 16-bit buffer CHANNEL2DATA. Next, the program proceeds to block 126 of FIG. 9.

Block 126 of FIG. 9, similar to block 106 of FIG. 8, determines if the calibration status, stored in variable CSTAT, is equal to zero. If the calibration status is zero, then the program proceeds to block 128 in which the 16-bit compass data of buffer CHANNEL2DATA is stored in the 16-bit variable VREF2. After block 128, the program proceeds to block 142. If block 126 determines that the calibration status is not equal to zero, then block 130 subtracts the value of variable VREF2 from the Channel 2 data of buffer CHANNEL2DATA. After block 130, block 132 determines if the difference between the Channel 2 data and variable VREF2 is less than 255. If not, then the Channel 2 data is saturated (above an upper limit), and block 138 sets 8-bit buffer CHANNEL2READING equal to 255, after which the program proceeds to block 142. If block 132 determines that the difference between the Channel 2 data of buffer CHANNEL2DATA and variable VREF2 is less than 255, then block 134 determines if the difference is greater than or equal to zero. If not, then the Channel 2 data is saturated (below a lower limit), and block 140 sets buffer CHANNEL2READING equal to one, after which the program proceeds to block 142. If block 134 determines that the difference between the Channel 2 data and variable VREF2 is greater than or equal to zero, then block 136 stores the difference, which is thus within the compass saturation limits, into buffer CHANNEL2READING, and the program proceeds to block 142. Block 142 executes the TWIT subroutine 166, described in greater detail below in connection with FIGS. 11 and 12, which checks if the value of buffer CHANNEL2READING has undergone a change which is greater than the expected change caused by turning of the vehicle. Upon return from the TWIT subroutine 166, the program proceeds to block 144. Block 144 determines if either Channel 1 or Channel 2 is saturated by checking whether the value of buffer CHANNEL1READING or buffer CHANNEL2READING is 1 or 255. If neither channel is saturated, the program proceeds to block 148. If either of the two channels is saturated, then block 146 determines if variable CSTAT is equal to 4 which would indicate that the crossings of a second circle are being collected. If it is, then the program proceeds to block 154 of FIG. 10. If the calibration status is not equal to 4, then block 148 determines if flag TWITFLAG is set indicating that at least one of the channels is twitting, as determined in the TWIT subroutine 166. If at least one of the channels is twitting, then the program proceeds to block 154 of FIG. 10. If neither channel is twitting, then the program proceeds to block 150 of FIG. 10.

Block 150 of FIG. 10 combines the current value of buffer CHANNEL1READING with a cumulative sum stored in 8-bit buffer SUM1, and the current value of buffer CHANNEL2READING with a cumulative sum stored in 8-bit buffer SUM2. As described below, these sums are averaged every two seconds after 16 channel readings have been combined. Next, block 152 executes the automatic calibration subroutine 198 which is described in detail in connection with FIGS. 13–18. Upon return from the automatic calibration subroutine 198, the program proceeds to block 154. Block 154 determines if 16 channel readings have been summed in buffers SUM1 and SUM2 which would have occurred over a 2 second period of time. If not, then the program proceeds to block 164 which causes the main compass routine 100 to be exited, thus enabling microprocessor 44 to perform other vehicular functions. If 16 channel readings have been summed in buffers SUM1 and SUM2, then block 156 divides the 2 second sums of each buffer by 16 to calculate the average Channel 1 reading and average Channel 2 reading. Next, block 158 calculates the arc tangent of the ratio of the Channel 1 reading average and the Channel 2 reading average to obtain an angle measurement from which the heading of the vehicle may be determined. After block 158, block 160 stores the heading angle for subsequent display of the vehicle heading to the operator of the vehicle via display 52. Next, block 162 clears buffers SUM1 and SUM2, and the main compass routine is exited via block 164.

Figure 11:
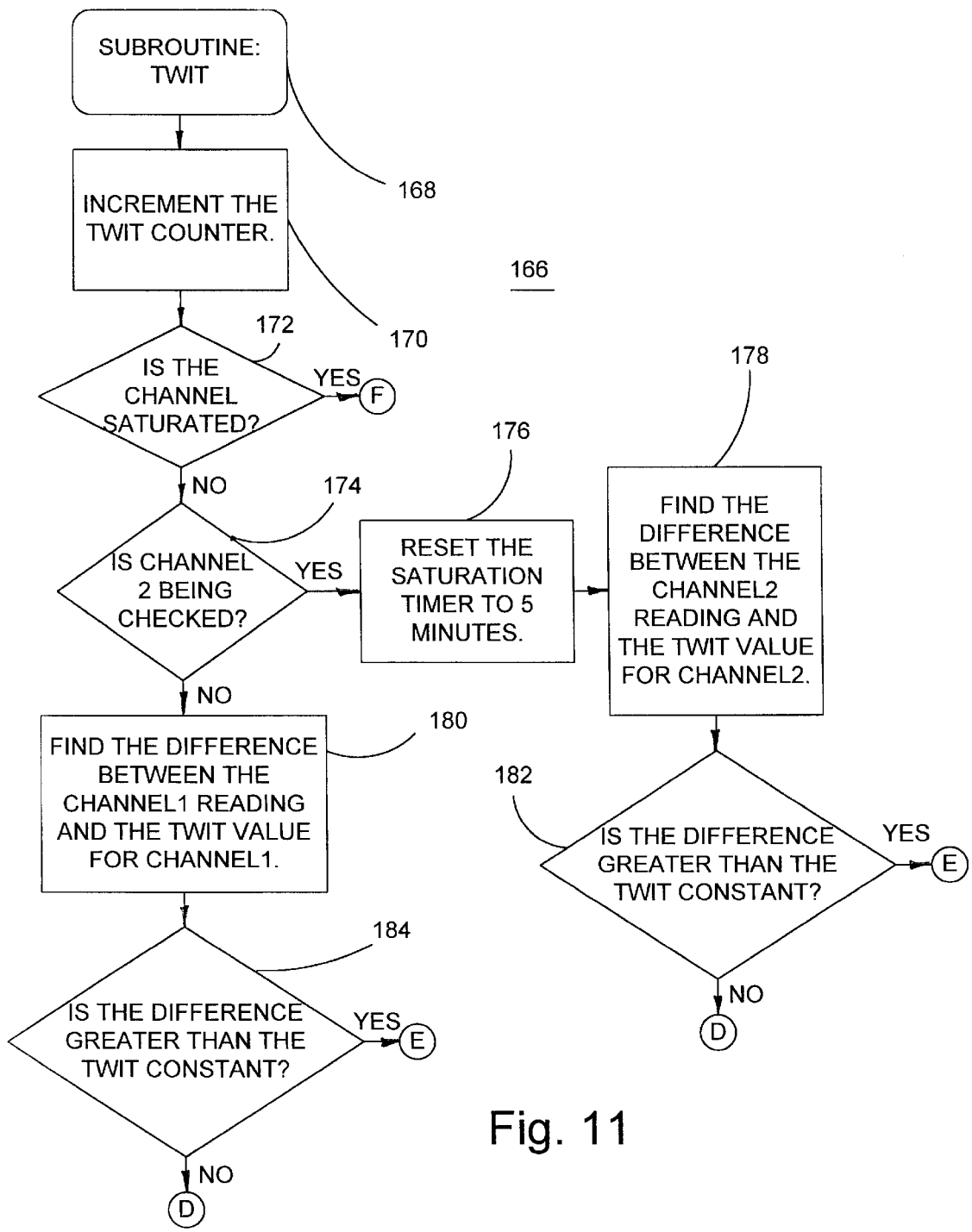

Referring now to FIG. 11, shown is the TWIT subroutine 166 that determines if a compass channel reading has undergone a significant change which is greater than the expected change caused by turning of the vehicle. Such a situation is referred to as a twit. After block 168 which signifies the beginning of the subroutine, block 170 increments the twit counter which keeps track of the number of consecutive channel readings that have caused a twit. Next, block 172 determines if the channel being checked (Channel 1 or Channel 2) is saturated by checking whether the value in the appropriate buffer (CHANNEL1READING or CHANNEL2READING) is 1 or 255. If the channel is saturated, the program proceeds to block 196 of FIG. 12. If the channel is not saturated, then block 174 determines if it is Channel 2 which is being checked. If it is, then block 176 resets the saturation timer to 5 minutes. The saturation timer is a counter that is decremented at a constant rate while either channel is at an upper or lower limit (1 or 255), and can be used to reinitiate the calibration of the compass system when saturation is present for a particular period of time (five minutes in the preferred embodiment). After block 176, block 178 calculates the difference between the 8-bit count value stored in buffer CHANNEL2READING and the value of 8-bit variable TWITVALUE2 which is the most recent Channel 2 reading that was not a twit. Next, block 182 determines if the difference calculated in block 178 is greater than constant TWITCONSTANT which establishes when either channel heading has undergone a significant change which is greater than the expected change caused by turning of the vehicle such that a twit is present. If the difference is greater than constant TWITCONSTANT such that a twit is present, then the program proceeds to block 190 of FIG. 12. If the difference is not greater than constant TWITCONSTANT such that a twit is not present, then the program proceeds to block 186 of FIG. 12. Returning to block 174, if it is determined that channel 2 is not being checked, then block 180 calculates the difference between the 8-bit count value stored in buffer CHANNEL1READING and the value of 8-bit variable TWITVALUE1 which is the most recent Channel 1 reading that was not a twit. Next, block 184 determines if the difference calculated in block 180 is greater than constant TWITCONSTANT. If it is, then a twit is present and the program proceeds to block 190 of FIG. 12. If the difference is not greater than constant TWITCONSTANT, then a twit is not present and the program proceeds to block 186 of FIG. 12.

Figure 12:
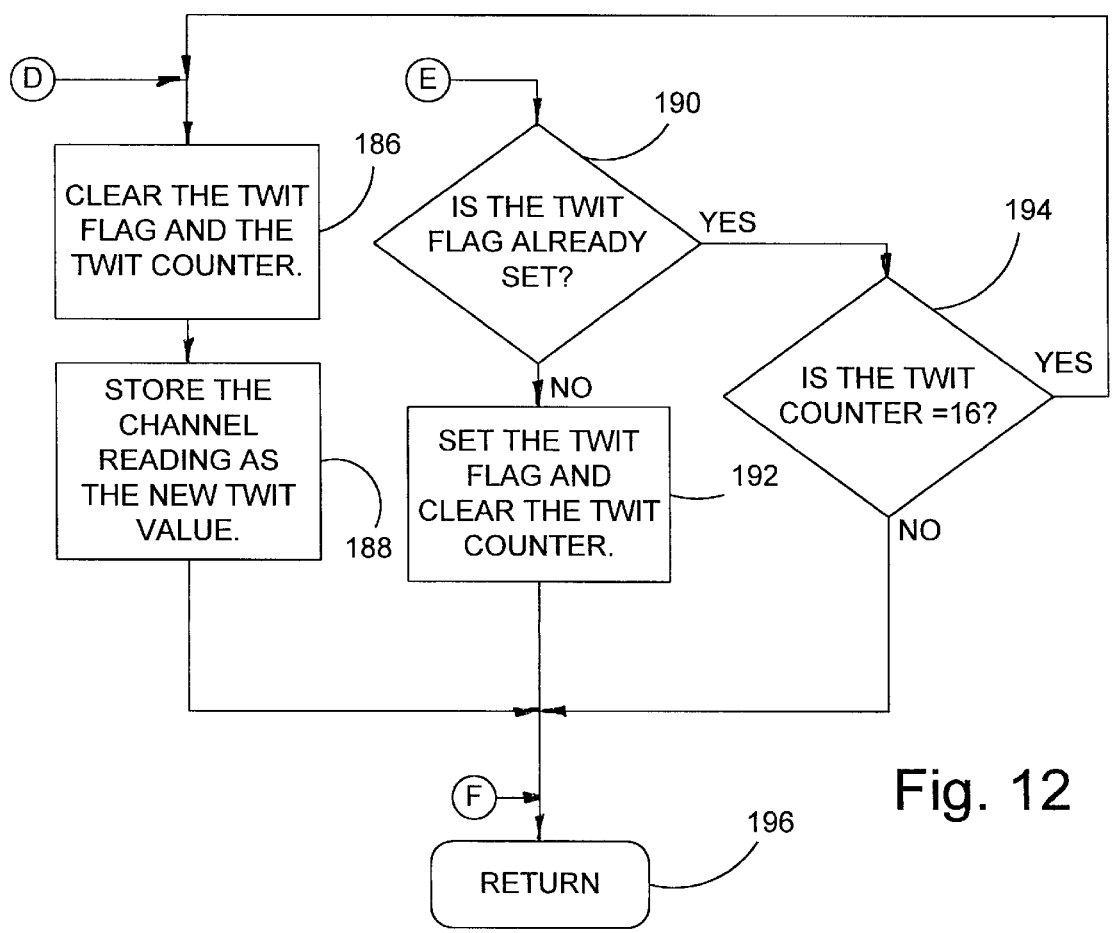

Referring now to FIG. 12, block 186 of the TWIT subroutine 166, which is entered if a twit is not present, clears flag TWITFLAG so as to not indicate that a twit has occurred. Block 186 also clears the twit counter so that the number of consecutive channel readings causing a twit is zero. Next, block 188 stores the current 8-bit channel reading in either variable TWITVALUE1 or variable TWITVALUE2 depending on which channel is being checked. The subroutine is then exited via block 196. Block 190 of the TWIT subroutine 166, which is entered if a twit is present, determines if flag TWITFLAG is already set. If it is, then block 194 determines if the twit counter is equal to 16 indicating that there have been 16 consecutive channel readings that have caused a twit. If the twit counter is equal to 16, then it is desirable to accept the current channel reading as "good" data, and the program proceeds to block 186 described above. If block 194 determines that the twit counter is not equal to 16, then the program proceeds to block 196 and the subroutine is exited. Returning to block 190, if it is determined that flag TWITFLAG is not already set, then block 192 sets flag TWITFLAG and clears the twit counter. The subroutine is then exited via block 196.

Figure 13:
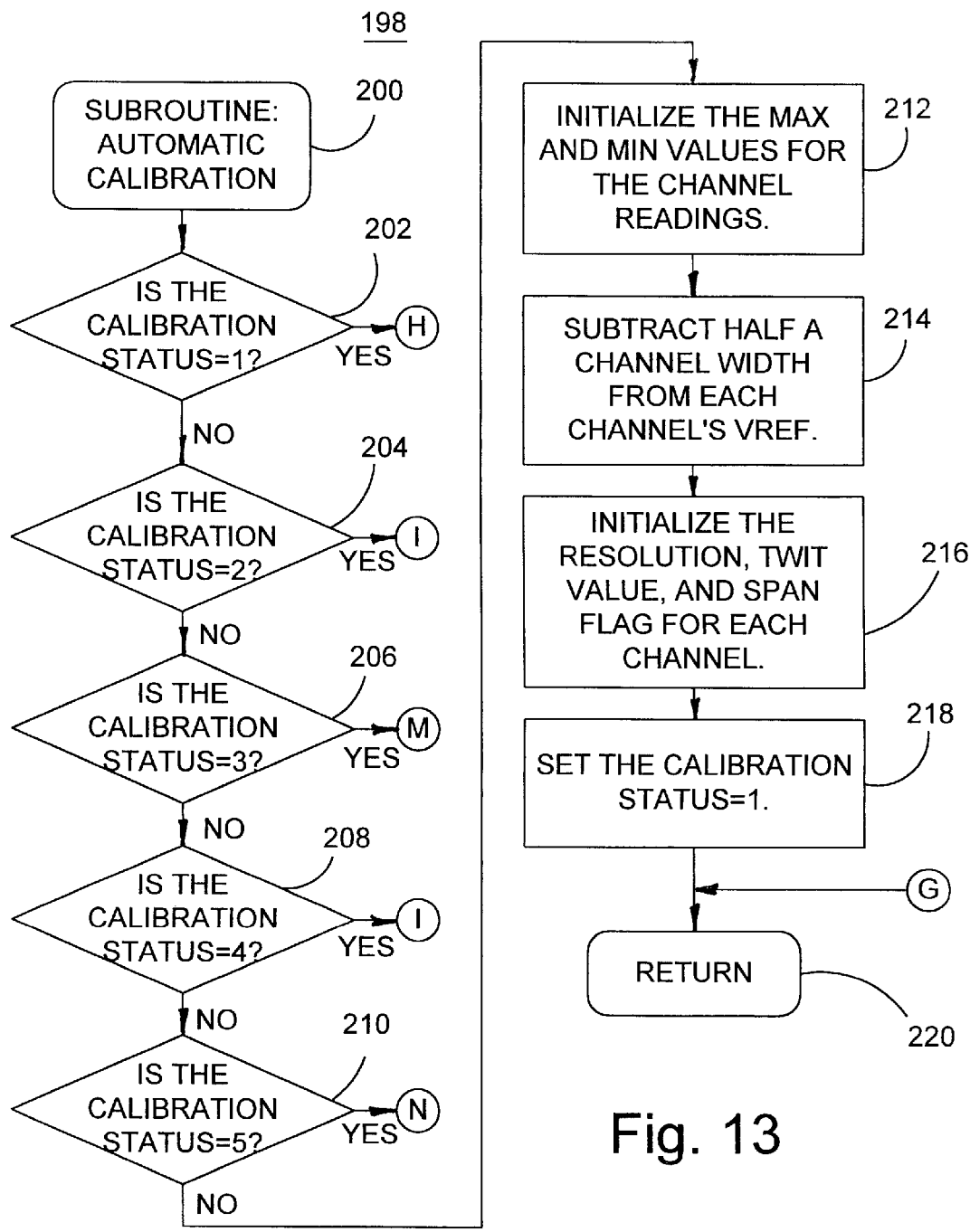

Referring now to FIG. 13, shown is the automatic calibration subroutine 198 which manipulates the 8-bit zero-compensated count values in buffers CHANNEL1READING and CHANNEL2READING, as well as other compass parameters. After block 200 which signifies the beginning of the subroutine, block 202 determines if the calibration status, stored in variable CSTAT, is equal to one. The calibration status is equal to one after the initiation for calibration has been completed and before the crossings of a first circle are collected. If block 202 determines that the calibration status is equal to one, then the program proceeds to block 222 of FIG. 14. If not, then block 204 determines if the calibrations status is equal to two. Variable CSTAT is equal to two when the crossing of the first circle are to be collected. If block 204 determines that the calibration status is equal to two, then the program proceeds to block 244 of FIG. 15. If not, then block 206 determines if the calibration status is equal to three. The calibration status is equal to three when the first circle of compass channel reading values is to be processed. If block 206 determines that the calibration status is equal to three, then the program proceeds to block 274 of FIG. 17. If not, then block 208 determines if the calibration status is equal to four. Variable CSTAT is equal to four when the crossings of a second circle are to be collected. If block 208 determines that the calibration status is equal to four, then the program proceeds to block 244 of FIG. 15. If not, then block 210 determines if the calibration status is equal to five which is when the second circle of compass channel reading values is to be processed. If the calibration status is equal to five, then the program proceeds to block 280 of FIG. 17. If not, then the calibration status is equal to zero, and the program proceeds to block 212.

Block 212 of FIG. 13 is entered when variable CSTAT is equal to zero and the compass system is to be initialized for calibration. Block 212 initializes 8-bit variables CHANNEL1MAX and CHANNEL2MAX to zero and 8-bit variables CHANNEL1MIN and CHANNEL2MIN to 255. These variables store the maximum and minimum values of the compass channel readings, and are initialized as such in order to ensure that subsequent values are stored into them. Next, block 214 subtracts 128 counts, which is half of the measurement range of the compass channel readings, from each channel's VREF variable. Because 16-bit variables VREF1 and VREF2 are initially set equal to the channel data in blocks 108 and 128 of the main compass routine 100 when CSTAT is equal to zero, this subtraction causes the variables to be 128 counts less than the channel data. After block 214, block 216 initializes variables RESOLUTION1 and RESOLUTION2 to the experimentally obtained number of cycles of the output signal of oscillator circuit 57 (divided by 8) that correspond to a 4 milligauss to count ratio, and loads the value of these variables into resolution registers 60 and 62, respectively. Block 216 also initializes the variable TWITVALUE1 to the current value in buffer CHANNEL1READING, the variable TWITVALUE2 to the current value in buffer CHANNEL2READING, and the flags SPANFLAG1 and SPANFLAG2 to zero. Next, block 218 sets the calibration status, stored in variable CSTAT, equal to one, and the subroutine is exited via block 220.

Figure 14:
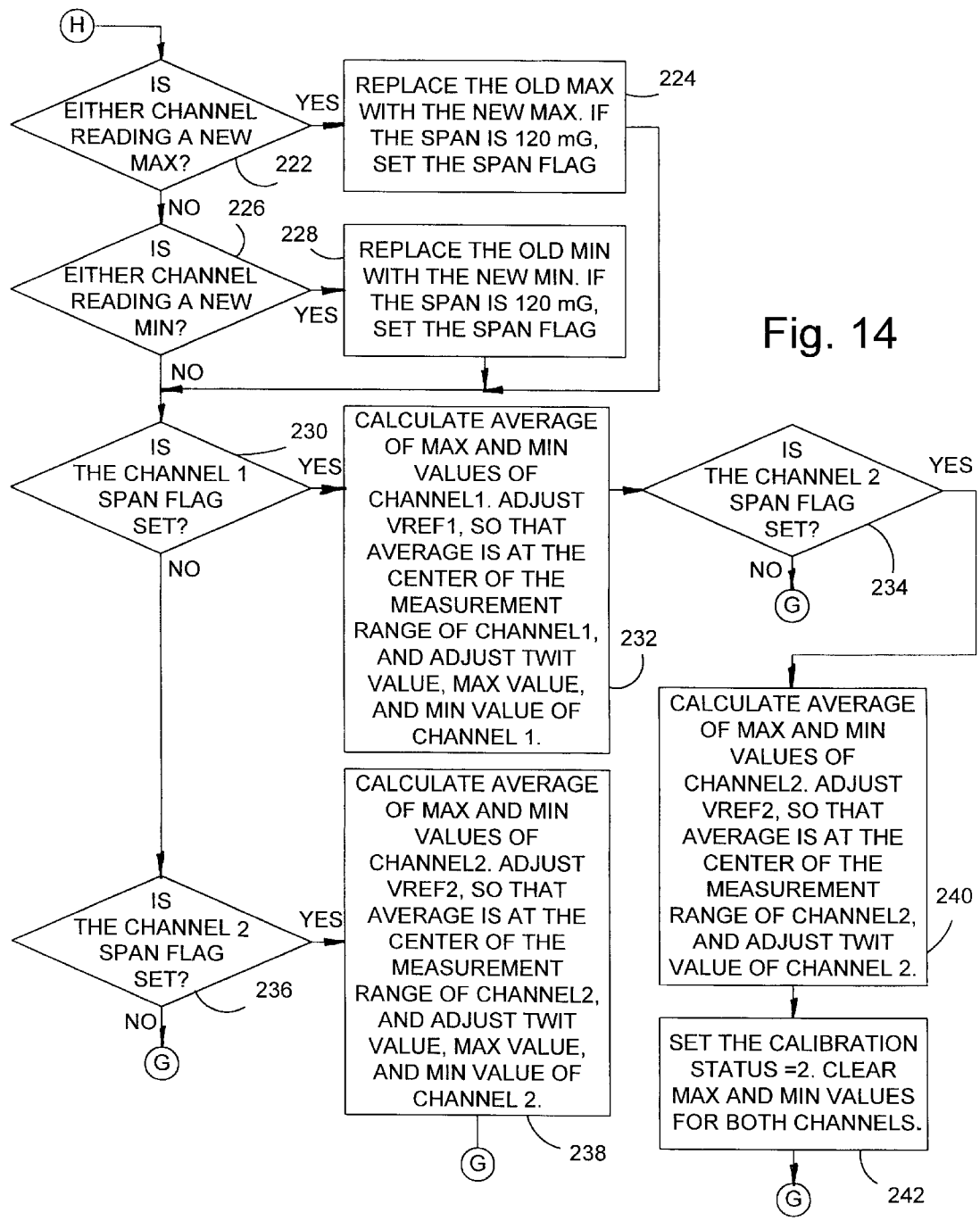

Referring now to FIG. 14, block 222 is entered if block 202 of FIG. 10 determines that the calibration status is equal to one. Block 222 compares each current channel reading to each channel's maximum value stored in variables CHANNEL1MAX and CHANNEL2MAX and determines if either channel reading provides a new maximum value. If so, then block 224 replaces either variable CHANNEL1MAX or CHANNEL2MAX, depending on which channel is at a new maximum reading value, with the current channel reading and, if the magnetism corresponding to the span between that channel's maximum and minimum values is now greater than or equal to 120 milligauss (which equates to approximately 37 counts based on an initial resolution of 1 milligauss per count), then that channel's span flag (SPANFLAG1 or SPANFLAG2) is set. After block 224, the program proceeds to block 230. If block 222 determines that neither channel reading provides a new maximum value, then block 226 compares each current channel reading to each channel's minimum value stored in variables CHANNEL1MIN and CHANNEL2MIN and determines if either channel reading provides a new minimum value. If so, then block 228 replaces either variable CHANNEL1MIN or CHANNEL2MIN, depending on which channel is at a new minimum reading value, with the current channel reading and, if the magnetism corresponding to the span between that channel's maximum and minimum values is now greater than or equal to 120 milligauss, then that channel's span flag (SPANFLAG1 or SPANFLAG2) is set. After block 228, or if block 226 determines that neither channel reading provides a new minimum value, the program proceeds to block 230.

Block 230 of FIG. 14 determines if flag SPANFLAG1 is set indicating that the magnetism corresponding to the span between Channel 1's maximum and minimum values is greater than or equal to 120 milligauss. If so, block 232 calculates the average of the maximum and minimum values of Channel 1, stored in variables CHANNEL1MAX and CHANNEL1MIN, and stores the result in 8-bit variable CHANNEL1MIDPOINT. Block 232 also adjusts the measurement range of Channel 1 by adjusting variable VREF1 so that the value of variable CHANNEL1MIDPOINT is at the center of the measurement range. This adjustment of the measurement range of Channel 1 necessitates that block 232 also adjust variable TWITVALUE1 and the channel's maximum and minimum values stored in variables CHANNEL1MAX and CHANNEL1MIN. Next, block 234 determines if flag SPANFLAG2 is set indicating that the magnetism associated with the span between Channel 2's maximum and minimum values is greater than or equal to 120 milligauss. If not, then the program proceeds to block 220 of FIG. 13 whereupon the subroutine is exited. If flag SPANFLAG2 is set, then block 240 calculates the average of the maximum and minimum values of Channel 2, stored in variables CHANNEL2MAX and CHANNEL2MIN, and stores the result in 8-bit variable CHANNEL2MIDPOINT. Block 240 also adjusts the measurement range of Channel 2 by adjusting variable VREF2 so that the value of variable CHANNEL2MIDPOINT is at the center of the measurement range. This adjustment of the measurement range of Channel 2 necessitates that block 240 also adjust variable TWITVALUE2. Next, block 242 sets variable CSTAT (calibration status) equal to two, and clears variables CHANNEL1MAX, CHANNEL2MAX, CHANNEL1MIN, and CHANNEL2MIN. After block 242, the program proceeds to block 220 of FIG. 13 whereupon the subroutine is exited.

If block 230 of FIG. 14 determines that flag SPANFLAG1 is not set, then block 236 determines if flag SPANFLAG2 is set. If not, then the program proceeds to block 220 of FIG. 13 whereupon the subroutine is exited. If block 236 determines that flag SPANFLAG2 is set, then block 238 calculates the average of the maximum and minimum values of Channel 2, stored in variables CHANNEL2MAX and CHANNEL2MIN, and stores the result in 8-bit variable CHANNEL2MIDPOINT. Block 238 also adjusts the measurement range of Channel 2 by adjusting variable VREF2 so that the value of variable CHANNEL2MIDPOINT is at the center of the measurement range. This adjustment of the measurement range of Channel 2 necessitates that block 238 also adjust variable TWITVALUE2 and the channel's maximum and minimum values stored in variables CHANNEL2MAX and CHANNEL2MIN. The program then proceeds to block 220 of FIG. 13 whereupon the subroutine is exited.

Figure 15:
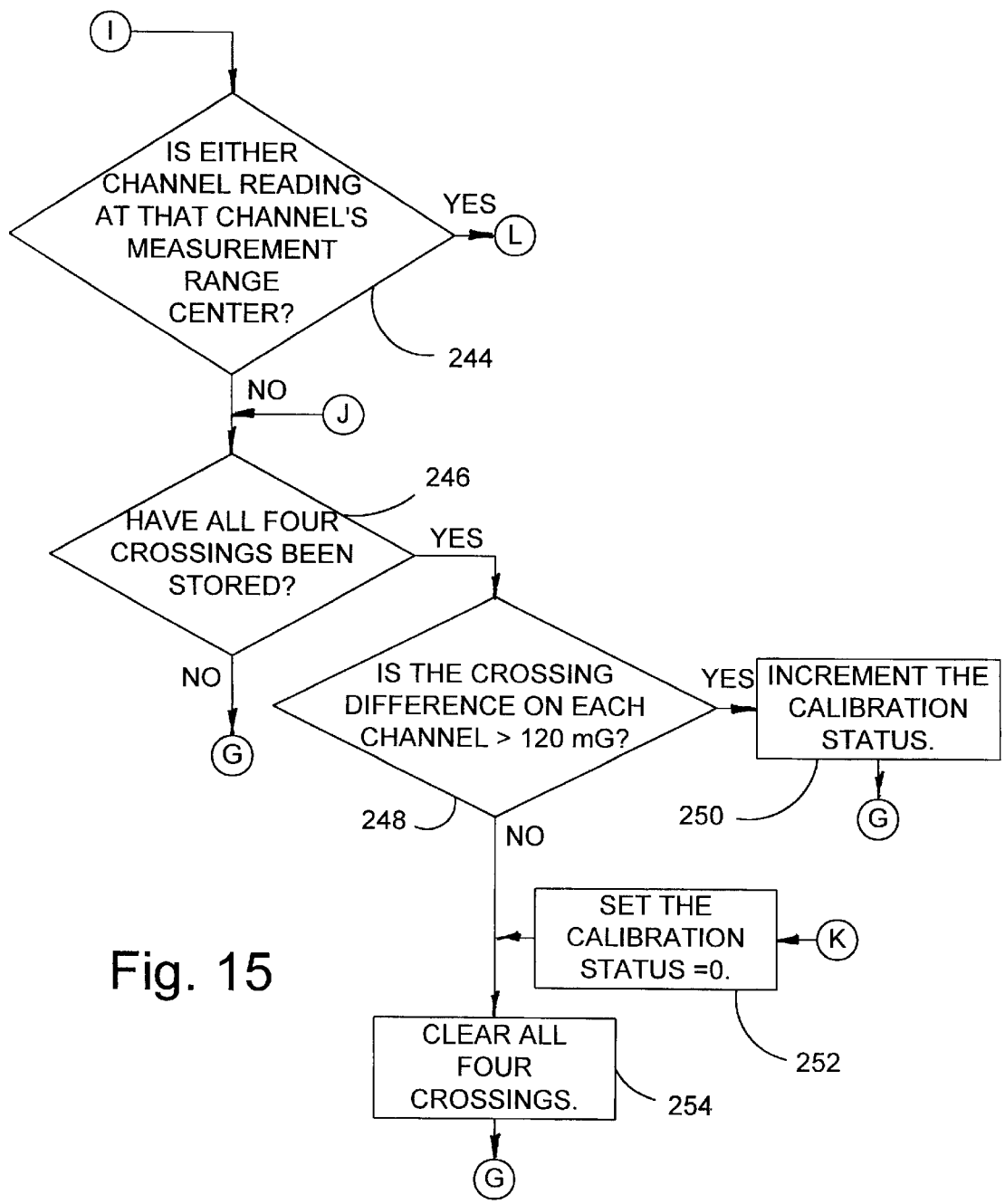

Referring now to FIG. 15, block 244 is entered if block 204 of FIG. 13 determines that the calibration status is equal to two or if block 208 of FIG. 13 determines that the calibration status is equal to four. Block 244 determines if either current channel reading is at the center of the range of measurement of that channel which equates to 128 counts. Such a determination would indicate that the other channel is at its maximum or minimum value (due to the circular nature of the plot on the X-Y coordinate plane) such that its channel reading represents a crossing value where the circular plot of channel readings crosses the axis of the X-Y coordinate plane. If either channel reading is at the center of its range of measurement, then the program proceeds to block 256 of FIG. 16. If neither channel reading is at the center of its range of measurement, then block 246 determines if all four circle crossings have been stored. The four circle crossings consist of an upper and lower crossing for each compass channel (depending on which side of the origin of the coordinate plane the channel reading is plotted), and are the maximum and minimum values of the compass channel readings. As such, the circle crossings are stored, by means of the programming of FIG. 16, into variables CHANNEL1MAX, CHANNEL2MAX, CHANNEL1MIN, and CHANNEL2MIN which are reinitialized in block 242 of FIG. 14. If block 246 determines that all four circle crossings have not been stored, then the program proceeds to block 220 of FIG. 13 whereupon the subroutine is exited. If block 246 determines that all four circle crossings have been stored, then block 248 determines if the crossing difference on each channel (the difference between each channel's upper and lower crossing which is the same as the diameter of the plotted circle) is greater than 120 milligauss which equates to a 60 milligauss field strength (radius of the circle) on that channel. Because a 60 milligauss field strength is abnormally small, the crossing difference is normally greater than 120 milligauss unless the channel crossings are erroneous. If the crossing difference on each channel is greater than 120 milligauss, then block 250 increments the calibration status. The program then proceeds to block 220 of FIG. 13 whereupon the subroutine is exited. If block 248 determines that the crossing difference on each channel is not greater than 120 milligauss such that the crossings most likely are erroneous, then block 254 clears all four crossing values (stored in variables CHANNEL1MAX, CHANNEL2MAX, CHANNEL1MIN, AND CHANNEL2MIN), and the program proceeds to block 220 of FIG. 13 whereupon the subroutine is exited. Block 252 of FIG. 15 is entered via block 270 of FIG. 16, as described below. Block 252 sets the calibration status equal to zero, and then the program proceeds to block 254 described above.

Figure 16:
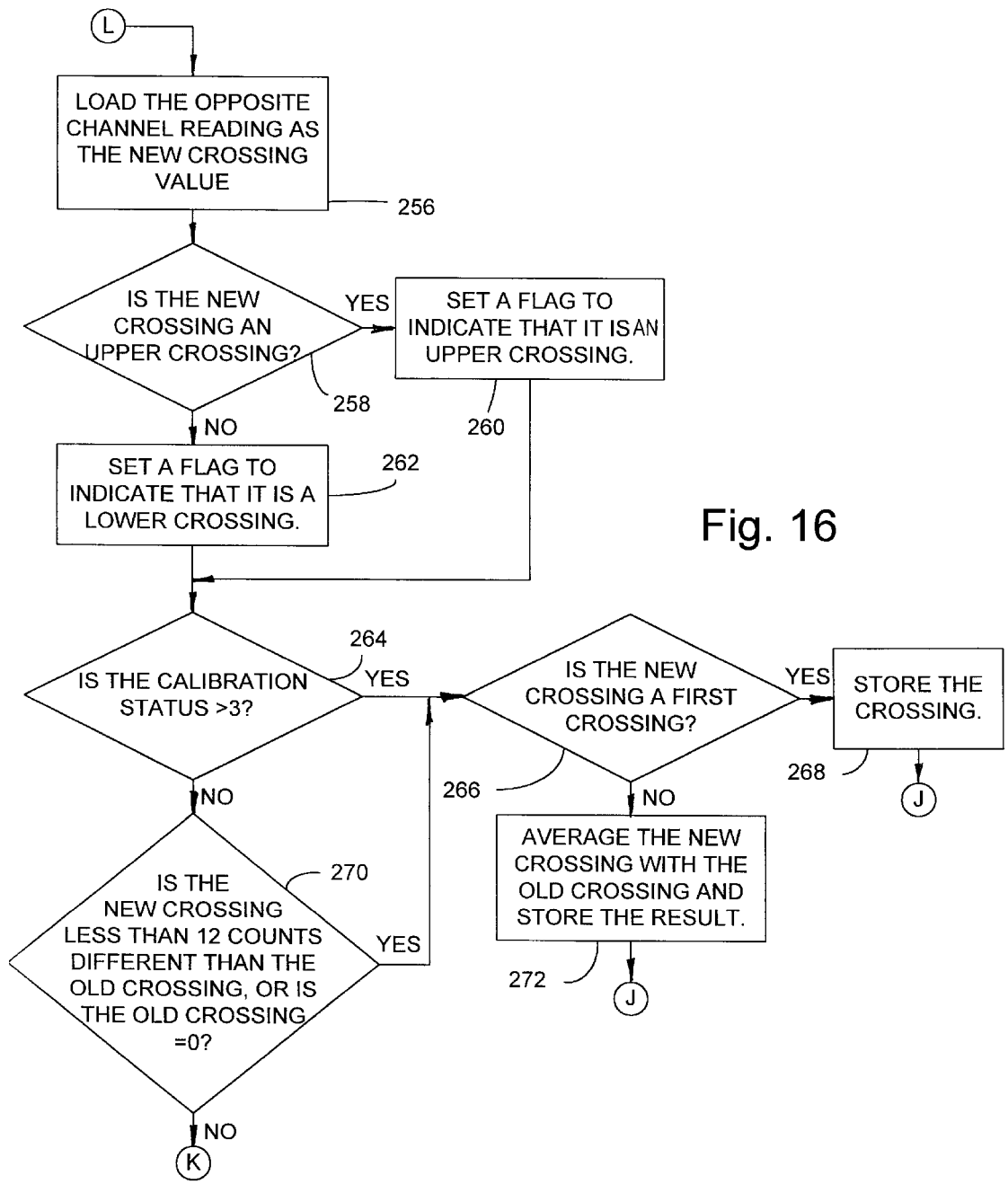

Referring now to FIG. 16, block 256 is entered if block 244 of FIG. 15 determines that either channel reading is at the center of the range of measurement of that channel which would indicate that the other channel is at its maximum or minimum value (due to the circular nature of the plot on the X-Y coordinate plane). Block 256 loads the opposite (or other) channel reading into temporary storage as a new crossing value for that channel. Next, block 258 determines if the new crossing value is greater than the center of the measurement range of that channel (128 counts) such that it is an upper crossing. If it is, then block 260 sets flag UPPERCROSSINGFLAG. If block 258 determines that the new crossing value is not an upper crossing, then block 262 sets flag LOWERCROSSINGFLAG. After block 260 or 262, the programming proceeds to block 264 which determines if the calibration status is greater than three. If not, then the compass system is still working with the channel reading values for the first circle, and the program proceeds to block 270. Block 270 determines if the new crossing value (stored in temporary storage) is less than 12 counts different from the old crossing value (stored in variable CHANNEL1MAX, CHANNEL1MIN, CHANNEL2MAX, or CHANNEL2MIN, depending on the channel of the crossing and whether flag UPPERCROSSINGFLAG or flag LOWERCROSSINGFLAG is set), or if the old crossing value is zero which would indicate that the current channel reading is the first upper or the first lower crossing for that channel. If the old crossing value is not zero, the operation of block 270 ensures that the crossings obtained for the first circle are consistent and not affected by magnetic noise. If neither of the conditions of block 270 is satisfied, then the program proceeds to block 252 of FIG. 15 wherein the calibration status is reset to zero. If at least one of the conditions of block 270 is satisfied, then the program proceeds to block 266. Block 266 is also entered if block 264 determines that the calibration status is greater than three. Block 266 determines if the new crossing value is the first upper or first lower crossing for that channel which would be the case if the value stored in the appropriate variable (CHANNEL1MAX, CHANNEL2MAX, CHANNEL1MIN, or CHANNEL2MIN) is zero. If it is, then block 268 stores the new crossing value in the appropriate variable, and the program proceeds to block 246 of FIG. 15. If block 266 determines that the new crossing value is not the first upper or first lower crossing for that channel, then block 272 averages the new crossing value with the old crossing value (stored in variable CHANNEL1MAX, CHANNEL2MAX, CHANNEL1MIN, or CHANNEL2MIN), and stores the result in the appropriate variable. This filtering avoids excessively abrupt changes in the compass parameters. After block 272, the program proceeds to block 246 of FIG. 15.

Figure 17:
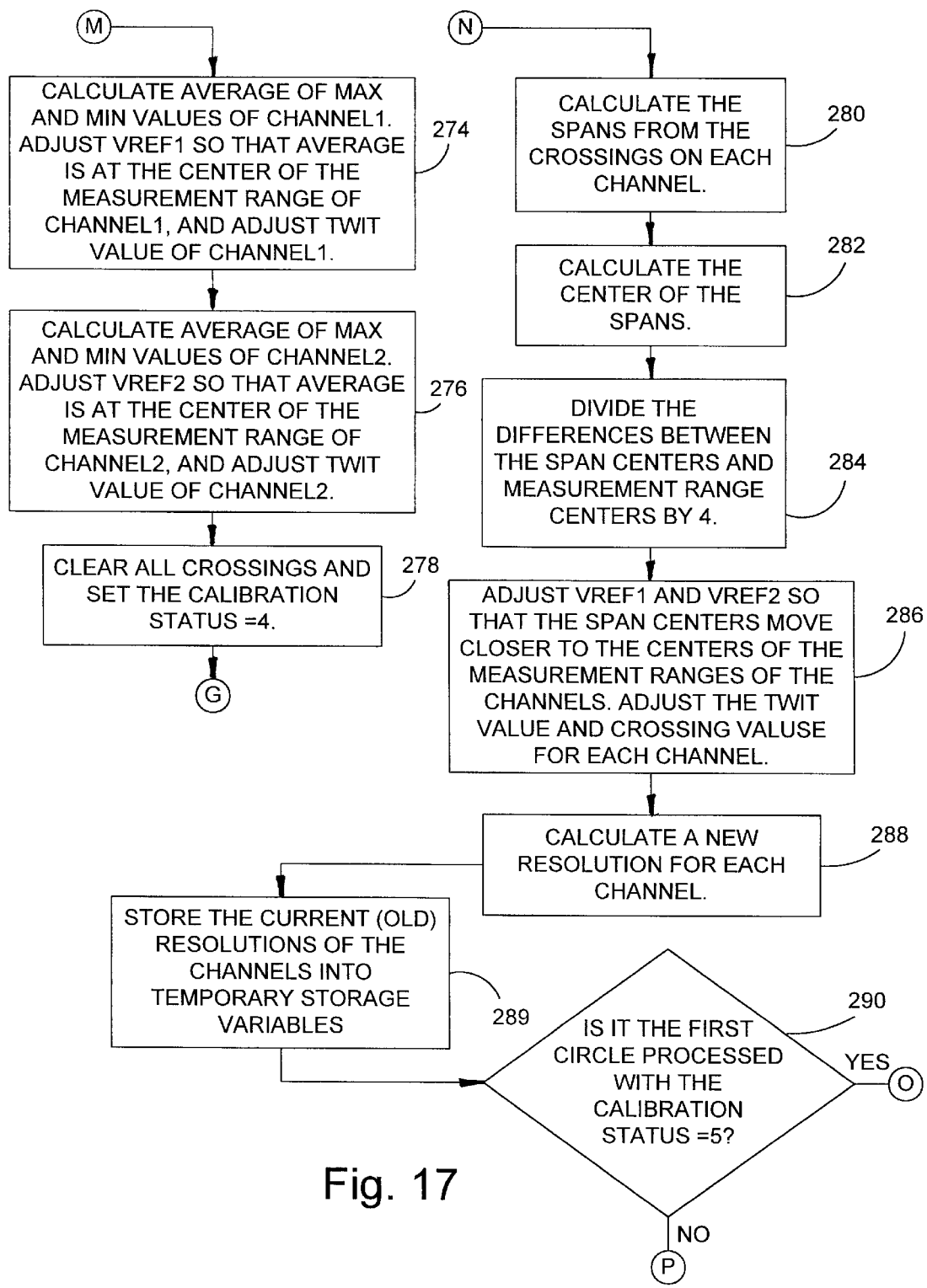

Referring now to FIG. 17, block 274 is entered if block 206 of FIG. 13 determines that the calibration status is equal to three. Block 274 calculates the average of the maximum and minimum values of Channel 1, stored in variables CHANNEL1MAX and CHANNEL1MIN, and stores the result in 8-bit variable CHANNEL1MIDPOINT. Block 274 also adjusts the measurement range of Channel 1 by adjusting variable VREF1 so that the value of variable CHANNEL1MIDPOINT is at the center of the measurement range. This adjustment of the measurement range of Channel 1 necessitates that block 274 also adjust variable TWITVALUE1. Next, block 276 calculates the average of the maximum and minimum values of Channel 2, stored in variables CHANNEL2MAX and CHANNEL2MIN, and stores the result in 8-bit variable CHANNEL2MIDPOINT. Block 276 also adjusts the measurement range of Channel 2 by adjusting variable VREF2 so that the value of variable CHANNEL2MIDPOINT is at the center of the measurement range. This adjustment of the measurement range of Channel 2 necessitates that block 276 also adjust variable TWITVALUE2. After block 276, block 278 clears all channel crossing values (stored in variables CHANNEL1MAX, CHANNEL2MAX, CHANNEL1MIN, and CHANNEL2MIN), and sets the calibration status equal to four. The program then proceeds to block 220 of FIG. 13 whereupon the subroutine is exited.

Block 280 of FIG. 17 is entered if block 210 of FIG. 13 determines that the calibration status is equal to five. Block 280 calculates the span of the channel readings on each channel by calculating the difference between each channel's crossing values stored when variable CSTAT was equal to four. The span of the Channel 1 readings is stored in 8-bit variable CHANNEL1SPAN, and the span of the Channel 2 readings is stored in 8-bit variable CHANNEL2SPAN. The spans are the diameter of the circular plot of channel readings along each channel's measurement direction. Next, block 282 calculates the center of the channel spans (which is the center of the plotted circle) by calculating the average of each channel's crossing values. The results are stored in 8-bit variables CHANNEL1MIDPOINT and CHANNEL2MIDPOINT. After block 282, block 284 calculates the difference between the value of variable CHANNEL1MIDPOINT and the channel reading corresponding to the center of measurement of Channel 1 (128 counts), divides the difference by four, and stores the result in temporary storage. Block 284 also calculates the difference between the value of variable CHANNEL2MIDPOINT and the channel reading corresponding to the center of measurement of Channel 2 (128 counts), divides the difference by four, and stores the result in temporary storage. The division of the differences of block 284 is to ensure that compass parameters are not changed too abruptly. Next, block 286 adjusts variables VREF1 and VREF2 by the quotients obtained in block 284 so as to adjust the measurement range of Channels 1 and 2 such that the value of variable CHANNEL1MIDPOINT moves closer to the center of the measurement range of Channel 1 and the value of variable CHANNEL2MIDPOINT moves closer to the center of the measurement range of Channel 2. This adjustment of the measurement range of each channel necessitates that block 286 also adjust the crossing values for each channel (stored in variables CHANNEL1MAX, CHANNEL2MAX, CHANNEL1MIN, and CHANNEL2MIN), and variables TWITVALUE1 and TWITVALUE2 for each channel by the quotients obtained in block 284. After block 286, the program proceeds to block 288.

Block 288 of FIG. 17 calculates the values of variables NEWRESOLUTION1 and NEWRESOLUTION2 according to the following equations which are based on the linear relationship between the number of cycles of the output signal of oscillator circuit 57 (divided by 8) and the number of counts of counter 70:

$$\frac{\text{RESOLUTION1}}{\text{CHANNEL1SPAN}} = \frac{\text{NEWRESOLUTION1}}{\text{IDEALSPAN}}$$

$$\frac{\text{RESOLUTION2}}{\text{CHANNEL2SPAN}} = \frac{\text{NEWRESOLUTION2}}{\text{IDEALSPAN}}$$

In these equations, variables RESOLUTION1 and RESOLUTION2 hold the values currently stored in Channel 1 resolution register 60 and Channel 2 resolution register 62, respectively, which determine the number of cycles completed by the output signal of oscillator circuit 57 for the Channel 1 and Channel 2 compass data currently being processed. Constant IDEALSPAN represents the desired span of count values in both measurement directions, and is 160 counts in the preferred embodiment. Variables CHANNEL1SPAN and CHANNEL2SPAN hold the current span of count values in both measurement directions. After solving the above equations for variables NEWRESOLUTION1 and NEWRESOLUTION2, these variables will hold the number of cycles (divided by 8) which the output signal generated by oscillator circuit 57 would have to complete, if the magnetic field strength remained constant from the current measurement period, in order for the span of the plotted circle in each measurement direction to be the desired predetermined amount stored in constant IDEALSPAN. By later adjusting variables RESOLUTION1 and RESOLUTION2 according to the values of variables NEWRESOLUTION1 and NEWRESOLUTION2, Channel 1 and Channel 2 resolution registers 60 and 62 will ultimately be loaded with values which will enlarge or reduce the size of the last plotted circle in an attempt to obtain subsequent plots having the desired size defined by constant IDEALSPAN. After block 288, block 289 stores the current values of variables RESOLUTION1 and RESOLUTION2 into temporary storage variables RESOLUTION1TEMP and RESOLUTION2TEMP, respectively. Next, block 290 determines if it is the first circle of channel readings processed with the calibration status equal to five. If it is, then the program proceeds to block 292 of FIG. 15. If not, then the program proceeds to block 294 of FIG. 18.

Figure 18:
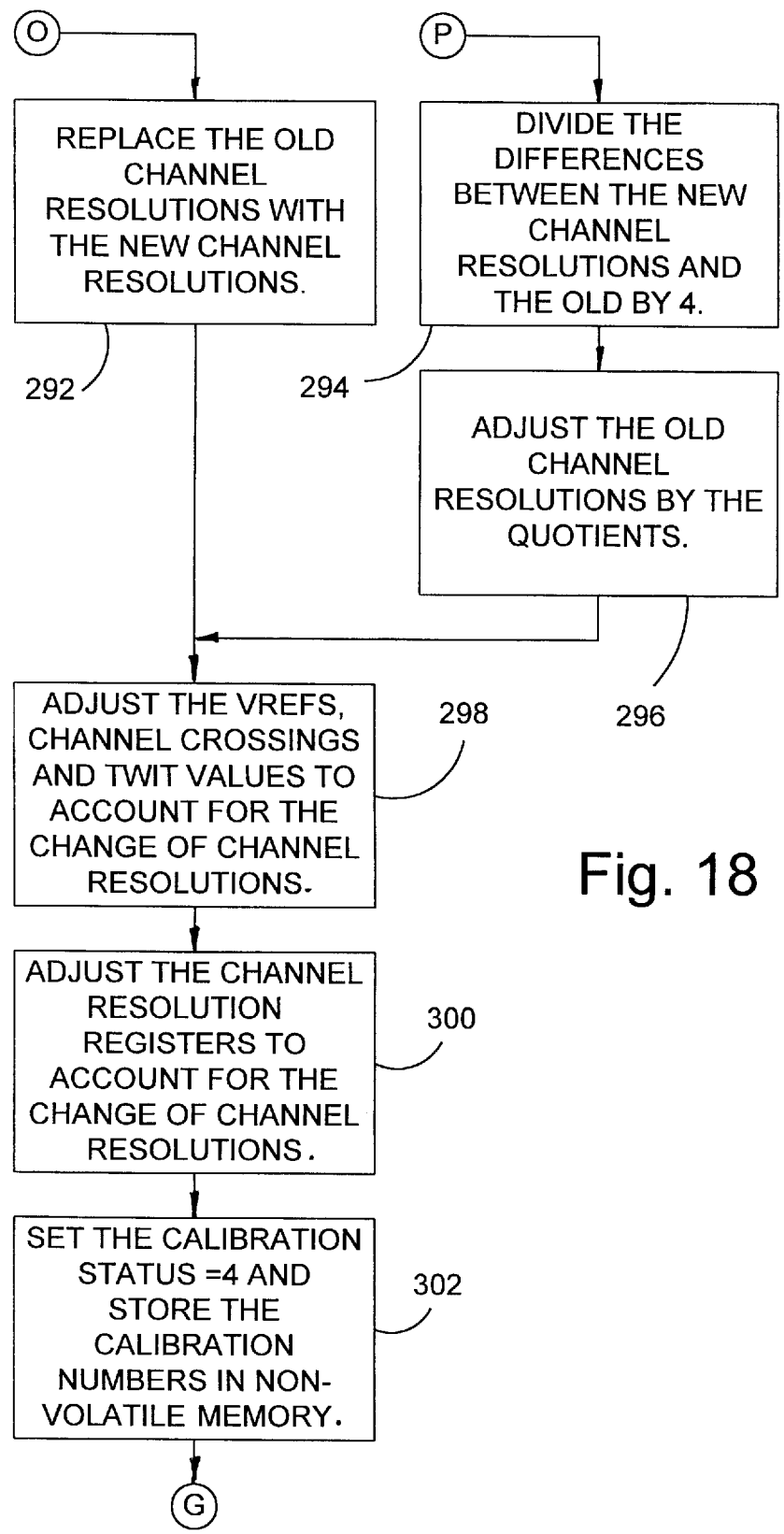

Referring now to FIG. 18, block 292 is entered if block 290 of FIG. 17 determines that it is the first circle processed with the calibration status equal to five. Block 292 loads variables RESOLUTION1 and RESOLUTION2 with the values of variables NEWRESOLUTION1 and NEWRESOLUTION2, respectively, which were calculated in block 288 of FIG. 17. Because the values of variables RESOLUTION1 and RESOLUTION2 are loaded into resolution registers 60 and 62, respectively, in block 300 below, this will cause the next plot of count values to have spans in each measurement direction that equal the value of constant IDEALSPAN. After block 292, the program then proceeds to block 298. Block 294 of FIG. 15 is entered if block 290 of FIG. 14 determines that it is not the first circle processed with the calibration status equal to five. Block 294 calculates the difference between the values in variables RESOLUTION1 and NEWRESOLUTION1 and the difference between the values in variables RESOLUTION2 and NEWRESOLUTION2. Block 294 also divides each of these differences by four and stores the quotients in variables QUOTIENT1 and QUOTIENT2. Next, block 296 adjusts the values of variables RESOLUTION1 and RESOLUTION2 by the values of variables QUOTIENT1 and QUOTIENT2, respectively. Specifically, the value of variable RESOLUTION1 is increased by the value of variable QUOTIENT1 if the value of variable NEWRESOLUTION1 was greater than the value of variable RESOLUTION1 in block 294, and the value of variable RESOLUTION1 is decreased by the value of variable QUOTIENT1 if the value of variable NEWRESOLUTION1 was less than the value of variable RESOLUTION1 in block 294. The value of variable RESOLUTION2 is similarly adjusted by the value of variable QUOTIENT2 depending on the comparison of the values of variables NEWRESOLUTION2 and RESOLUTION2 in block 294. By adjusting the values of variables RESOLUTION1 and RESOLUTION2 by the quotients obtained in block 294 instead of loading the variables with the values of variables NEWRESOLUTION1 and NEWRESOLUTION2 as done in block 292, the compass system is prevented from changing too abruptly. This will cause subsequent plots of count values to have spans in each measurement direction which will approach the value of constant IDEALSPAN over time. After block 296, the program proceeds to block 298.

Block 298 of FIG. 18 calculates the new values for variables VREF1, VREF2, CHANNEL1MAX, CHANNEL1MIN, CHANNEL2MAX, CHANNEL2MIN, TWITVALUE1, and TWITVALUE2 to account for the change in resolution of the compass system. The new values of these variables are dependent on their current values, and are calculated based on the following equations (implementing a generic variable X and temporary variables RESOLUTION1TEMP and RESOLUTION2TEMP which store the original non-adjusted values of variables RESOLUTION1 and RESOLUTION2) which are similar to the equations used in block 288:

$$\frac{\text{RESOLUTION1TEMP}}{X(\text{current Channel 1 value})} = \frac{\text{RESOLUTION1}}{X(\text{new Channel 1 value})}$$

$$\frac{\text{RESOLUTION2TEMP}}{X(\text{current Channel 2 value})} = \frac{\text{RESOLUTION2}}{X(\text{new Channel 2 value})}$$

Substituting the above variables for generic variable X of these equations and solving for the new values of the variables provides the following equations:

$$\text{VREF1 (new value)} = \frac{\text{RESOLUTION1} \times \text{VREF1 (current value)}}{\text{RESOLUTION1TEMP}}$$

$$\text{VREF2 (new value)} = \frac{\text{RESOLUTION2} \times \text{VREF2 (current value)}}{\text{RESOLUTION2TEMP}}$$

CHANNEL1MAX (new value) =

$$\frac{\text{RESOLUTION1} \times \text{CHANNEL1MAX (current value)}}{\text{RESOLUTION1TEMP}}$$

CHANNEL1MIN (new value) =

$$\frac{\text{RESOLUTION1} \times \text{CHANNEL1MIN (current value)}}{\text{RESOLUTION1TEMP}}$$

CHANNEL2MAX (new value) =

$$\frac{\text{RESOLUTION2} \times \text{CHANNEL2MAX (current value)}}{\text{RESOLUTION2TEMP}}$$

CHANNEL2MIN (new value) =

$$\frac{\text{RESOLUTION2} \times \text{CHANNEL2MIN (current value)}}{\text{RESOLUTION2TEMP}}$$

TWITVALUE1 (new value) =

$$\frac{\text{RESOLUTION1} \times \text{TWITVALUE1 (current value)}}{\text{RESOLUTION1TEMP}}$$

-continued $$\text{TWITVALUE2 (new value)} = \frac{\text{RESOLUTION2} \times \text{TWITVALUE2 (current value)}}{\text{RESOLUTION2TEMP}}$$

After block 298, block 300 adjusts the resolution of the compass system by loading the new value of variable RESOLUTION1 into Channel 1 resolution register 60 and the new value of variable RESOLUTION2 into Channel 2 resolution register 62. These are the adjustment signals mentioned above. Next, block 302 sets the calibration status equal to four and stores the compass calibration numbers in nonvolatile memory circuit 48. Setting variable CSTAT equal to four enables the crossings for a subsequent circle to be collected. The program then proceeds to block 220 of FIG. 13 whereupon the subroutine is exited.

As described above, the preferred embodiment of the present invention adjusts the resolution of the compass system by changing the values stored in Channel 1 resolution register 60 and Channel 2 resolution register 62 which changes the number of cycles completed by the output signal of oscillator circuit 57. It should be noted that the resolution of the compass system can also be adjusted by changing the frequency of the clock signal which controls the counting rate of up/down counter 70. In this alternate embodiment, a clock frequency value is maintained for each of sensors 40 and 42 (with the clock frequency associated with a particular sensor controlling the counting of counter 70 for both oscillation polarities of that sensor), and the number of cycles completed by the output signal of oscillator circuit 57 is kept at the same constant value for both sensors. By adjusting the clock frequency associated with a particular sensor by means of adjustment signals from microprocessor 44, counter 70 will count more or less counts for a particular amount of magnetism as compared to if the frequency had not been adjusted. In this manner, the milligauss to count ratio of the zero-compensated count values (data signals) and the resolution of the compass system can be changed.

Figure 19:
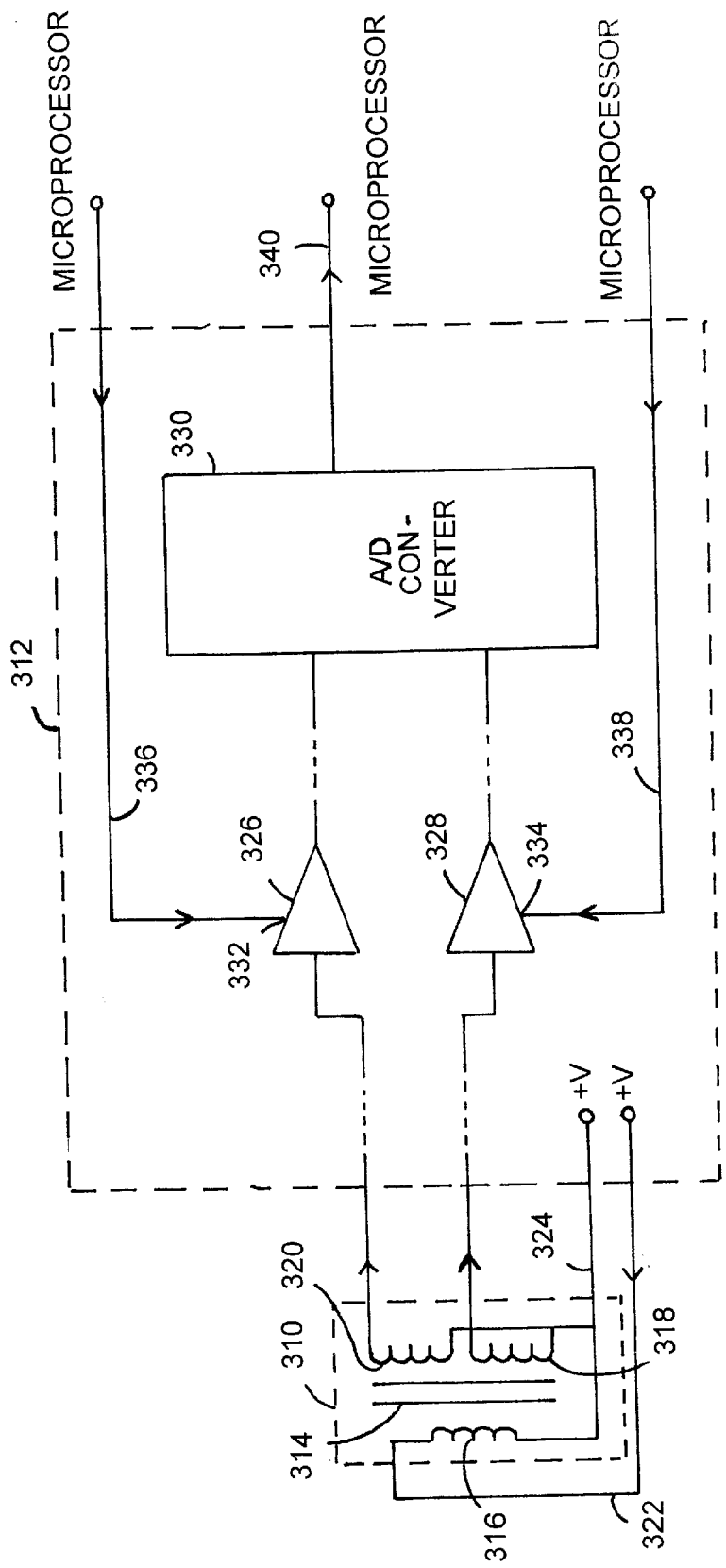
FIG. 19 is an electrical circuit diagram of the magnetic field sensor and interfacing circuit of an alternate embodiment of the present invention.

Another alternate embodiment of the compass system of the present invention is shown in FIG. 19. In this embodiment, sensors 40 and 42 of the preferred embodiment are replaced by a flux-gate sensor 310, and interface circuit 46 is replaced with interfacing circuitry 312 similar to that disclosed in U.S. Pat. No. 4,953,305. Sensor 310 includes an annular core 314 around which is wound a primary winding 316, a secondary East/West sensing winding 318, and a secondary North/South sensing winding 320. Primary winding 316 is driven by a 0- to 5-volt signal supplied by circuit 312 via line 322 to selectively drive annular core 314 into saturation. An intermediate reference ground is provided to the windings of sensor 310 from circuit 312 via line 324. FIG. 19 shows interfacing circuitry 312 in a simplified form consisting of amplifiers 326 and 328 with their outputs coupled to an 8-bit analog to digital converter 330. Amplifiers 326 and 328 have variable gain control inputs 332 and 334, respectively, which enable the gain of each amplifier to be adjusted by the microprocessor by means of adjustment signals via lines 336 and 338, respectively. Secondary sensing windings 318 and 320 of sensor 310 supply voltage signals representing the magnetic field sensed within the vehicle to the input of amplifiers 328 and 326, respectively, of interfacing circuitry 312. These electrical signals are amplified according to the value of the variable gain control of each amplifier, and are supplied to A/D converter 330 where they are converted into 8-bit digital count values (data signals). These digital signals are then supplied to the microprocessor via line 340.

By adjusting the variable gain control of amplifiers 326 and 328 by means of adjustment signals from the microprocessor, the circular plot of count values and the resolution of the compass system can be changed. For example, let us assume that each of secondary sensing windings 318 and 320 supply voltage signals with each volt representing four milligauss of magnetism, and that A/D converter 330 converts these electrical signals, after amplification by amplifier 328 or 326, into count values (data signals) with a one count per volt ratio. If the variable gain control of a particular amplifier is set such that the gain is one, then the amplified signal will be the same as the original voltage signal from the corresponding secondary sensing winding, and will have the same four milligauss to volt ratio. A/D converter 330, with a one count per volt conversion ratio, will then convert this amplified signal into a count value equal to the number of volts of the original voltage signal and having a four milligauss to count ratio. If the variable gain control of the same amplifier is adjusted such that the gain is two, then the amplified signal will be twice as many volts as the original electrical signal from the secondary sensing winding and will be twice as many volts as the amplified signal when the gain was one. Because the same amount of magnetism will be represented by twice as many volts, each volt of the amplified signal will correspond to two milligauss of magnetism instead of four. A/D converter 330, with a one count per volt conversion ratio, will then convert this amplified signal into a count value (data signal) that is twice as large as the count value when the amplifier had a gain of one, with each count corresponding to two milligauss of magnetism instead of four. As such, the number of count values into which the electrical signals generated by that particular secondary sensing winding can be resolved is increased, and the span of the plot of count values in the measurement direction of that sensing winding is twice as large. Similarly, if the variable gain control of the same amplifier is adjusted such that the gain is one-half instead of the original gain of one, then the result will be a count value (data signal) that is half as large as the count value when the amplifier had a gain of one, with each count corresponding to eight milligauss of magnetism instead of four. As such, the number of count values into which the electrical signals generated by that particular secondary sensing winding can be resolved is decreased, and the span of the plot of count values in the measurement direction of that sensing winding is half as large.

As described above, the alternate "flux-gate" embodiment adjusts the resolution of the compass system by changing the variable gain control of amplifiers 326 and 328. It should be noted that the resolution of the compass system of this alternate embodiment can also be adjusted by changing the conversion (count per volt) ratio of A/D converter 330. In this alternate embodiment, a conversion ratio value is maintained for each of sensing windings 318 and 320, and amplifiers 326 and 328 are kept at the same constant gain. By adjusting the conversion ratio associated with a particular sensing winding by means of adjustment signals from the microprocessor, more or less counts will be equated with a particular amount of magnetism as compared to if the conversion ratio had not been adjusted. In this manner, the milligauss to count ratio of the count values (data signals) and the resolution of the compass system can be changed.

It is important to note in connection with the alternate "flux-gate" embodiments described above that adjusting the variable gain control of amplifiers 326 and 328, or the conversion ratio of A/D converter 330, by means of adjustment signals from the microprocessor accomplishes much more than just a multiplication of the count values (after the A/D conversion) by a particular factor. Such a multiplication, although changing the size of the plotted circle, would not increase or decrease the resolution of the compass system, and thus could not enable more accurate heading information to be provided when the magnitude of the sensed magnetic field of the earth is very small.

Because the alternate "flux-gate" embodiments described above implement an 8-bit A/D converter 330, the programming of these embodiments would be unable to calibrate the compass system by means of the "software" correction described above in connection with the preferred embodiment. This is because the dynamic operating range of the measurement system of the alternate embodiments is more limited. Instead, calibration would be accomplished by means of generating feedback or compensation signals to adjust the sensor range of measurement, as disclosed in the above-mentioned U.S. Pat. No. 4,953,305. However, if the 8-bit A/D converter was replaced with a 16-bit A/D converter, then the dynamic operating range of the measurement system of the alternate embodiments would be large enough to calibrate by means of the "software" correction.

The disadvantage of the alternate "flux-gate" embodiments described above is that interfacing circuitry 312 is much more expensive to implement than interface circuit 46 of the preferred embodiment. The high cost is mainly attributable to the use of an A/D converter. This is especially true if a 16-bit A/D converter is used in order to implement the "software" method of calibration.

The above description is considered that of the preferred embodiments only. Modifications of the invention will occur to those skilled in the art and to those who make or use the invention. Therefore, it is understood that the embodiments shown in the drawings and described above are for illustrative purposes and are not intended to limit the scope of protection of the invention, which is defined by the following claims as interpreted according to the principles of patent law.

The embodiments of the invention in which an exclusive property or privilege is claimed are defined as follows:

1. An electronic compass system for use in a vehicle such as an automobile comprising:

sensing means for detecting the earth's magnetic field and for providing electrical signals representative of the direction of the vehicle with respect to the earth's magnetic field;

circuit means coupled to said sensing means for resolving said direction representative electrical signals into a number of data points from which the detected direction of the vehicle may be calculated and providing heading output signals representing heading information corresponding to the detected direction; and an indicator coupled to said circuit means for providing an indication of the vehicle heading in response to said heading output signals, wherein said circuit means includes processing means responsive to the direction representative electrical signals for determining a relative field strength of the earth's magnetic field and for varying the resolution at which said circuit means resolves the direction representative electrical signals into heading information as a function of the detected strength of the earth's magnetic field to maintain a consistent degree of accuracy of the indicated heading information, wherein said processing means varies the resolution by adjusting the number of said data points into which said direction representative electrical signals can be resolved.

2. The compass system as defined in claim 1, wherein said sensing means includes at least one magneto-inductive sensor for providing the direction representative signals, and wherein said direction representative electrical signals vary in frequency based upon the strength of the earth's magnetic field and the relative orientation of said magneto-inductive sensor with respect to the direction of the earth's magnetic field.

3. The compass system as defined in claim 2, wherein said circuit means further includes frequency identification means coupled to said magneto-inductive sensor for determining the frequency of the direction representative signals and coupled to said processing means for supplying data representing the identified frequency of the direction representative signals.

4. The compass system as defined in claim 1, wherein said sensing means includes a first magneto-inductive sensor for providing component signals of the direction representative signals in a first direction and a second magneto-inductive sensor for providing component signals of the direction representative signals in a second direction perpendicular to the first direction, and wherein the component signals vary in frequency based upon the strength of the earth's magnetic field and the relative orientation of the magneto-inductive sensors with respect to the direction of the earth's magnetic field.

5. An electronic compass system for use in a vehicle such as an automobile comprising:

sensing means for detecting the earth's magnetic field and for providing electrical signals representative of the direction of the vehicle with respect to the earth's magnetic field, wherein said sensing means includes a first magneto-inductive sensor for providing component signals of the direction representative signals in a first direction and a second magneto-inductive sensor for providing component signals of the direction representative signals in a second direction perpendicular to the first direction, and wherein the component signals vary in frequency based upon the strength of the earth's magnetic field and the relative orientation of the magneto-inductive sensors with respect to the direction of the earth's magnetic field;

circuit means coupled to said sensing means for providing heading output signals representing heading information corresponding to the detected direction; and an indicator coupled to said circuit means for providing an indication of the vehicle heading in response to said heading output signals, wherein said circuit means includes processing means responsive to the direction representative signals for determining a relative field strength of the earth's magnetic field and for varying the resolution at which said circuit means translates the direction representative signals into heading information as a function of the detected strength of the earth's magnetic field to maintain a consistent degree of accuracy of the indicated heading information, wherein said circuit means further includes frequency identification means coupled to said magneto-inductive sensors for determining the frequency of the component signals of the direction representative signals and coupled to said processing means for supplying data signals representing the identified frequency of the component signals of the direction representative signals, and wherein said processing means determines the field strength of the earth's magnetic field based upon the respective frequencies of the component signals.

6. The compass system as defined in claim 5, wherein said frequency identification means includes:

a first register for storing a resolution number for a first channel associated with said first magneto-inductive sensor received from said processing means;

a second register for storing a resolution number for a second channel associated with said second magneto-inductive sensor received from said processing means; and a control circuit coupled to said first and second registers and to said first and second magneto-inductive sensors for measuring the time period for each component signal to cycle through a number of periods equal to the resolution number stored in the respective one of the first and second registers.

7. The compass system as defined in claim 6, wherein said processing means varies the resolution by changing the resolution number stored in at least one of the first and second registers.

8. The compass system as defined in claim 7, wherein said sensor means further includes a driver circuit coupled to said control circuit for driving a selected one of said first and second magneto-inductive sensors by supplying a driving signal thereto.

9. The compass system as defined in claim 8, wherein said driver circuit may be biased by a control signal supplied from said control circuit such that said driving signal may be selectively applied to either end of the selected one of said first and second magneto-inductive sensors.

10. The compass system as defined in claim 6, wherein said control circuit includes:

a ripple counter coupled to said sensor means for counting the number of cycles completed by said electrical signal;

a comparator coupled to said ripple counter and said first and second registers for comparing the number of cycles counted by said ripple counter with said resolution number stored in a selected one of said first and second registers and generating an output signal when the number of cycles equals said resolution number;

a compass controller coupled to said comparator for receiving the output signal from said comparator, coupled to said first and second registers for selecting one of the registers for said comparator to read and compare the resolution number stored therein, and coupled to said sensor means for selecting and enabling one of said first and second magneto-inductive sensors; and a counter coupled to said compass controller for measuring the time period required for an output signal to be generated by said comparator and generating a data signal in response to said measured time period representing the sensed magnetic field, said data signal being supplied to the said processing means.

11. The compass system as defined in claim 10, wherein said sensor means outputs electrical signals in four output modes including a first mode in which a driving signal is applied to one end of said first magneto-inductive sensor, a second mode in which a driving signal is applied to an opposite end of said first magneto-inductive sensor, a third mode in which a driving signal is applied to one end of said second magneto-inductive sensor, and a fourth mode in which a driving signal is applied to an opposite end of said second magneto-inductive sensor, and wherein said compass control circuit sequentially selects each of said four output modes.

12. The compass system as defined in claim 11, wherein said counter is an up/down counter and said compass controller initially selects said first mode and controls said up/down counter to count from zero upward, and, in response to the output signal from said comparator, said compass controller selects said second mode and controls said up/down counter to count downward from a count value representing the time period measured in the first mode such that the resulting count value stored in said up/down counter following the receipt of a second output signal from said comparator in said second mode considered with the resolution number represents the frequency of a component signal output from said first magneto-inductive sensor.

13. The compass system as defined in claim 12, wherein, in response to the second output signal generated by said comparator, said compass controller selects said third mode and controls said up/down counter to reset and count from zero upward, and, in response to a third output signal from said comparator, said compass controller selects said fourth mode and controls said up/down counter to count downward from a count value representing the time period measured in the third mode such that the resulting count value stored in said up/down counter following the receipt of a fourth output signal from said comparator considered with the resolution number represents the frequency of a component signal output from said second magneto-inductive sensor.

14. The compass system as defined in claim 1, wherein said indicator is a display for visually displaying the vehicle's heading.

15. The compass system as defined in claim 1, wherein said processing means converts said electrical signals into said data points by measuring the time period required for said electrical signals to complete a predetermined number of cycles.

16. The compass system as defined in claim 15, wherein said processing means adjusts the number of said data points into which said electrical signals can be resolved by changing said predetermined number of cycles that are completed by said electrical signals for a measured time period.

17. The compass system as defined in claim 16, wherein said time period is measured according to a predetermined clock frequency, and wherein said processing means adjusts the number of said data signals into which said electrical signals can be resolved by changing said predetermined clock frequency.

18. An electrical vehicle compass system capable of adapting to changes in the earth's magnetic field, comprising:

a magnetic field sensor for detecting the earth's magnetic field in at least two channels of measurement;

a control circuit coupled to said sensor for generating electrical signals in said at least two channels of measurement representing the direction of the vehicle in relation to the earth's magnetic field, said control circuit converting said electrical signals into data signals from which the heading of the vehicle may be calculated;

a processing circuit coupled to said control circuit and responsive to said data signals as the vehicle travels in a closed loop for determining the maximum and minimum detected signal levels of said data signals in said at least two channels of measurement and the spans between said maximum and minimum detected signal levels, said processing circuit adjusts the number of said data signals into which said electrical signals can be resolved such that the spans between said maximum and minimum detected signal levels of subsequent data signals more closely coincide with a desired predetermined level, said processing circuit generating display output signals in response to said data signals; and a display circuit coupled to said processing circuit and responsive to said display output signals for displaying the vehicle heading.

19. The compass system as defined in claim 18, wherein said sensor is comprised of at least one magneto-inductive sensor.

20. The compass system as defined in claim 18, wherein said control circuit converts said electrical signals into said data signals by measuring the time period required for said electrical signals to complete a predetermined number of cycles.

21. The compass system as defined in claim 20, wherein said processing circuit adjusts the number of said data signals into which said electrical signals can be resolved by changing said predetermined number of cycles that are completed by said electrical signals for a measured time period.

22. The compass system as defined in claim 20, wherein said time period is measured according to a predetermined clock frequency, and wherein said processing circuit adjusts the number of said data signals into which said electrical signals can be resolved by changing said predetermined clock frequency.

23. The compass system as defined in claim 18, wherein said sensor includes two magneto-inductive sensors driven by a driving signal, and said control circuit converts said electrical signals into said data signals by calculating the difference in time periods required for electrical signals output by one of said magneto-inductive sensors to complete a predetermined number of cycles when said driving signal is applied to opposite ends of the magneto-inductive sensor.

24. The compass system as defined in claim 18, wherein said desired predetermined level of the spans between said maximum and minimum detected signal levels is bounded by a first threshold value and a second threshold value, and wherein said processing circuit adjusts the resolution at which said control circuit converts said electrical signals into said data signals if at least one of the spans between said maximum and minimum detected signal levels is below said first threshold value or above said second threshold value.

25. The compass system as defined in claim 18, wherein said processing circuit includes a microprocessor.

26. An interface circuit for interfacing a microprocessor with a magnetic field sensor of a vehicle compass system, comprising:
a driver circuit coupled with the magnetic field sensor to form an oscillator circuit for generating an electrical signal representing the sensed magnetic field;
a ripple counter coupled to said oscillator circuit for counting the number of cycles completed by said electrical signal;
at least one register for storing a resolution number;
a comparator coupled to said ripple counter and said at least one register for comparing the number of cycles counted by said ripple counter with said resolution number stored in said at least one register and generating an output signal when the number of cycles equals said resolution number; and
a control circuit coupled to said comparator and the microprocessor, said control circuit including a counter for measuring the time period required for an output signal to be generated by said comparator and generating a data signal in response to said measured time period representing the sensed magnetic field, said data signal being supplied to the microprocessor.

27. The interface circuit as defined in claim 26, wherein said at least one register is coupled to the microprocessor, and wherein the microprocessor changes the resolution number stored in said at least one register in response to said data signal.

28. A vehicle compass circuit for providing vehicle heading information on a display, comprising:
a first magneto-inductive sensor associated with a first channel, said first magneto-inductive sensor positioned in the vehicle to sense fore and aft directional components of the earth's magnetic field along an axis representing the vehicle's direction of travel;
a second magneto-inductive sensor associated with a second channel, said second magneto-inductive sensor being positioned in the vehicle to sense directional components of the earth's magnetic field in a direction perpendicular to the axis representing the vehicle's direction of travel;
a driver circuit coupled to said first and second magneto-inductive sensors for applying a driving signal to a selected end of a selected one of said magneto-inductive sensors and generating electrical signals representing the sensed directional components of the earth's magnetic field;
a control circuit coupled to said driver circuit for selecting one of said first and second magneto-inductive sensors and selecting an end of the selected magneto-inductive sensor for said driver circuit to apply the driving signal;
an up/down counter coupled to said control circuit for counting upward from zero to a first value when the driving signal is applied to one end of a selected magneto-inductive sensor, for counting downward from said first value to a second value when the driving signal is applied to the opposite end of the selected magneto-inductive sensor, and for generating output data representing said second value from which a directional component of the earth's magnetic field may be derived; and
a processing circuit receiving said output data from said up/down counter, computing the vehicle's heading from the directional components of the earth's magnetic field and supplying data representative of the vehicle's heading to the display.

29. The compass system as defined in claim 28 and further including:
a ripple counter coupled to said driver circuit for counting the numbers of cycles completed by said electrical signals;
a first register for storing a resolution number associated with said first channel;
a second register for storing a resolution number associated with said second channel; and
a comparator coupled to control circuit, said ripple counter, and to said first and second registers for comparing the number of cycles counted by said ripple counter for a selected one of the first and second channels with the resolution number stored in the register associated with the selected channel and generating an output signal when the number of cycles equals said resolution number,
wherein said second value counted by said up/down counter represents a difference in measured time periods required for a first output signal to be generated by said comparator when the driving signal is applied to one end of the selected magneto-inductive sensor and for a second output signal to be generated by said comparator when the driving signal is applied to the opposite end of the selected magneto-inductive sensor.

30. An electronic compass system for use in a vehicle comprising:

sensing means for detecting the earth's magnetic field and for providing electrical signals representative of the vehicle's heading with respect to the earth's magnetic field; and a processing circuit coupled to said sensing means for providing heading output signals representing the vehicle's detected heading, said processing circuit being responsive to the direction representative signals for continuously determining a relative field strength of the earth's magnetic field and for continuously varying the resolution at which said processing circuit translates the direction representative signals into heading information as a function of the detected strength of the earth's magnetic field to maintain a consistent degree of accuracy of the indicated heading information.

31. An electronic compass system for use in a vehicle comprising:

a magnetic field sensor for detecting the earth's magnetic field in two channels of measurement and providing electrical signals representative of the vehicle's heading with respect to the earth's magnetic field; and a processing circuit coupled to said sensor for providing heading output signals representing the vehicle's detected heading, said processing circuit being responsive to the direction representative signals for determining a relative field strength of the earth's magnetic field and for substantially simultaneously varying for both of said two channels, the resolution at which said processing circuit translates the direction representative signals into heading information as a function of the detected strength of the earth's magnetic field to maintain a consistent degree of accuracy of the indicated heading information.

32. An electronic compass system for use in a vehicle comprising:

a magnetic field sensor for sensing the earth's magnetic field and for providing electrical signals representative of the vehicle's heading with respect to the earth's magnetic field;

a sensor interface circuit coupled to said sensor for translating the electrical signals output from said sensor into direction representative signals; and a processing circuit coupled to said sensor interface circuit for providing heading output signals representing the vehicle's detected heading, said processing circuit being responsive to the direction representative signals for determining a relative field strength of the earth's magnetic field and for dynamically varying the range of magnetic field levels in which said sensor interface circuit can detect magnetic fields from the electrical signals output from said sensor.

33. The compass system as defined in claim 32, wherein said processing circuit varies the range of detection of said sensor interface circuit as a function of the detected strength of the earth's magnetic field.

* * * * *